United States Patent
Obayashi et al.

(10) Patent No.: US 6,899,270 B2
(45) Date of Patent: May 31, 2005

(54) NONCONTACT READER/WRITER, INFORMATION COMMUNICATION SYSTEM USING THE SAME, AND MANAGEMENT SYSTEM USING THE SAME

(75) Inventors: Keiichiro Obayashi, Osaka (JP); Yasuhiko Kitajima, Osaka (JP); Nobuhiko Fujii, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 68 days.

(21) Appl. No.: 10/221,988

(22) PCT Filed: Nov. 15, 2001

(86) PCT No.: PCT/JP01/09983

§ 371 (c)(1),
(2), (4) Date: Dec. 18, 2002

(87) PCT Pub. No.: WO02/41158

PCT Pub. Date: May 23, 2002

(65) Prior Publication Data

US 2004/0098270 A1 May 20, 2004

(30) Foreign Application Priority Data

Nov. 20, 2000 (JP) ........................................ 2000-352207

(51) Int. Cl.7 ................................................ G06K 7/08
(52) U.S. Cl. ........................ 235/451; 235/375; 235/380; 235/381; 235/382; 235/492; 711/100; 711/101
(58) Field of Search ................................. 235/492, 380, 235/451, 381, 375, 382; 711/100, 102, 104

(56) References Cited

U.S. PATENT DOCUMENTS

| | | | | |
|---|---|---|---|---|
| 5,252,812 A | * | 10/1993 | Nakamura | 235/380 |
| 5,488,558 A | * | 1/1996 | Ohki | 701/207 |
| 5,583,850 A | * | 12/1996 | Snodgrass et al. | 370/342 |
| 5,698,837 A | * | 12/1997 | Furuta | 235/492 |
| 6,118,789 A | * | 9/2000 | Wood, Jr. | 370/462 |
| 6,352,202 B2 | * | 3/2002 | Takiguchi et al. | 235/451 |
| 6,354,500 B1 | * | 3/2002 | Gercekci et al. | 235/451 |
| 6,527,177 B1 | * | 3/2003 | Ishifuji et al. | 235/382 |

FOREIGN PATENT DOCUMENTS

| | | |
|---|---|---|
| EP | 0 887 774 A2 | 12/1998 |
| JP | 55-160399 | 12/1980 |
| JP | 58-137347 | 8/1983 |
| JP | 63-131745 | 6/1988 |
| JP | 7-177161 | 7/1995 |
| JP | 11-15927 | 1/1999 |
| JP | 11-85855 | 3/1999 |
| JP | 2000-182003 | 6/2000 |

* cited by examiner

Primary Examiner—Michael G. Lee
Assistant Examiner—Ahshik Kim
(74) Attorney, Agent, or Firm—RatnerPrestia

(57) ABSTRACT

A noncontact reader/writer is disclosed which performs, at a high speed, a processing of communication, such as read or write, with a plurality of noncontact information carriers such as noncontact IC cards. A transmitting unit transmits signals, such as commands, to the respective kinds of noncontact information carriers. A memory stores information about at least one of the kinds of noncontact information carriers with which the noncontact reader/writer communicated. A control unit decides, based on the stored information, the priority of the kinds of noncontact information carries in the communication processing and performs a communication processing. The stored information includes the kinds of noncontact information carriers or the number of occurences of communication with the respective kinds of noncontact information carriers.

36 Claims, 24 Drawing Sheets

FIG. 2

| Pointer | Communication priority | | |
|---|---|---|---|
| | 1 | 2 | 3 |
| 0 | Type A | Type B | Type C |
| 1 | Type A | Type C | Type B |
| 2 | Type B | Type A | Type C |
| 3 | Type B | Type C | Type A |
| 4 | Type C | Type A | Type B |
| 5 | Type C | Type B | Type A |

21
22

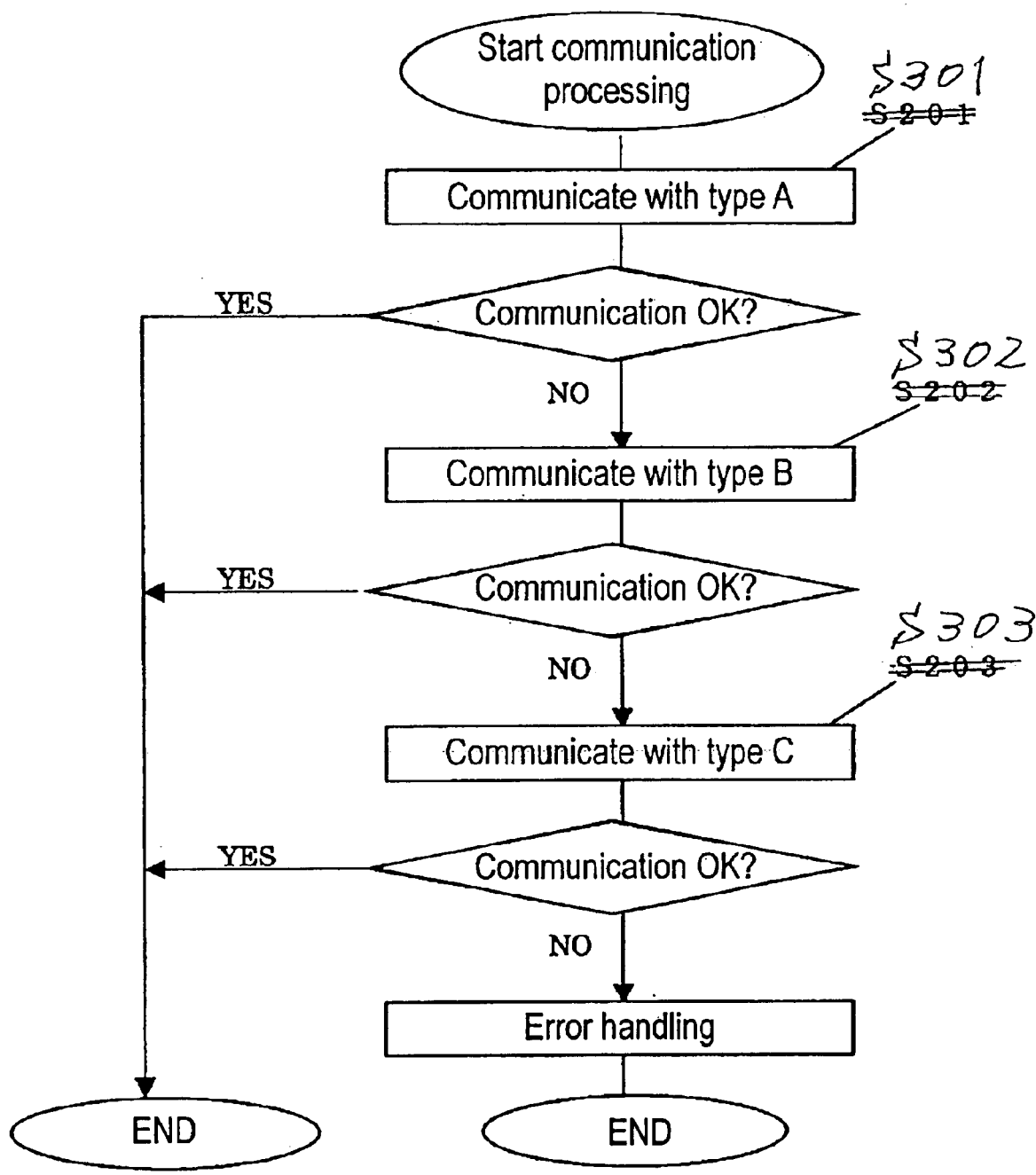

NONCONTACT READER/WRITER, INFORMATION COMMUNICATION SYSTEM USING THE SAME, AND MANAGEMENT SYSTEM USING THE SAME

This Application is a U.S. National Phase Application of PCT International Application PCT/JP01/09983.

TECHNICAL FIELD

The present invention relates to a noncontact reader/writer for reading and writing a noncontact information carrier, particularly to a reader/writer for a noncontact integrated circuit (IC) information carrier.

BACKGROUND ART

The noncontact IC information carrier maintains higher security and abrasion-resistance than a magnetic information carrier. Therefore, the noncontact IC information carrier is used, for example, as a commuter pass in a wicket of a station or as a point information carrier in a gas station, instead of a magnetic information carrier such as a magnetic stripe card.

However, there are varieties of noncontact IC information carriers including at least several kinds which are standardized in International Standardization Organization (ISO). In places that various kinds of noncontact IC information carriers are supposed to be used, a noncontact-IC-information-carrier reader/writer (hereinafter called reader/writer) capable of information communication processing such as reading and writing, with plural kinds of noncontact IC information carriers is recommended to be used.

Herein, type A represents ISO 14443 type A compliant information carrier, type B represents ISO 14443 type B compliant information carrier and type C represents ISO 15693 compliant information carrier. Each of them complies with different communication protocol.

FIG. 23 shows conventional reader/writer 101. Transmitter 102 sends a command signal to information carrier. Receiver 103 receives a response signal from information carrier.

Informing unit 107 informs controller 108 that a noncontact IC information carrier enters into a communication range of reader/writer 101. Then, controller 108, responsive to the information from informing unit 107, allows transmitter 102 to send a command to the noncontact IC information carrier.

Controller 108 allows power supply 109 to energize every unit constituting reader/writer 101, when receiving the response through receiver 103. Informing unit 107 is realized with a motion sensor capable of detecting a movement of the noncontact IC information carrier.

The motion sensor, as informing unit 107, detects the noncontact IC information carrier entering in the communication range of reader/writer 101, and informs it controller 108. Controller 108 starts communication processing, upon receiving the information from informing unit 107.

As shown in FIG. 24, controller 108 first communicates with an object in the communication range as a type A noncontact IC information carrier (S301). When failed in the communication with a type A noncontact IC information carrier, next, controller 108 communicates with the object as a type B noncontact IC information carrier (S302). Similarly, when failed in reading responses as a type B noncontact IC information carrier, then controller 108 communicates with the object as a type C noncontact IC information carrier (S303).

In the above-mentioned prior art, even if a noncontact IC information carrier being in the communication range of reader/writer 101 is a type C noncontact IC information carrier, first reader/writer starts communication with an information carrier in the communication range as a type A noncontact IC information carrier. Next, the reader/writer communicates with the noncontact IC information carrier as a type B information carrier. After that, the reader/writer communicates with the noncontact IC information carrier as a type C noncontact IC information carrier. Accordingly, in some cases, it takes long time for the reader/writer to complete the communication after receiving an instruction to start the communication.

In addition, in the case of battery powered noncontact IC information carrier reader/writer, the long communication time shortens a total operation time of the battery.

DISCLOSURE OF THE INVENTION

The present invention aims at providing a device to shorten communication time of a noncontact reader/writer with a noncontact information carrier.

A noncontact reader/writer of the present invention can communicate with each of plural kinds of noncontact information carriers. A transmitter sends signals such as a command to each of plural kinds of noncontact information carriers. Receiver receives signals such as a response from each of plural kinds of noncontact information carriers. A memory stores information on a kind of at least one of plural kinds of noncontact information carriers with which the noncontact reader/writer has communicated.

In communication processing, based upon the information, a controller determines a priority order on the kinds of the plural kinds of noncontact information carriers and carries out the communication processing.

Moreover, the noncontact reader/writer disclosed in the present invention includes a priority memory which stores a priority table to indicate a priority order on the kinds of the plural kinds of noncontact information carriers. Herein, the afore-mentioned priority memory stores a pointer value which represents a specific priority order in the priority table. Then, the controller determines the pointer value according to each kind of the plural kinds of noncontact information carriers with which the noncontact reader/writer has communicated. Moreover, in the next occasion of communication, the controller carries out communication responsive to the priority order indicated by the pointer value.

Moreover, in a noncontact reader/writer in another exemplary embodiment, the above-mentioned memory stores, as a communication times memory, a number of communication times with the noncontact reader/writer in each kind of plural kinds of noncontact information carriers. When communication processing, the controller carries out communication, while determining the priority order based on the contents of the communication times memory.

As described above, the noncontact reader/writer in the present invention carries out speedy communication processing by communications with the noncontact information carrier based on the priority order on the kind of noncontact information carrier.

In addition, in a communication system in the present invention, an above-mentioned noncontact reader/writer communicates with a plurality of servers.

Moreover, in a management system in the present invention, an above-mentioned noncontact reader/writer works for sorting articles.

BRIEF DESCRIPTION OF THE DRAWINGS

FIG. 2 is a schematic view of a communication priority table of a reader/writer used in the first exemplary embodiment of the present invention.

FIG. 24 is a flowchart of communication processing of a conventional reader/writer.

DETAILED DESCRIPTION OF EXEMPLARY EMBODIMENTS

The present invention is explained by the following exemplary embodiments. A noncontact reader/writer (hereinafter called reader/writer) for reading and writing a noncontact information carrier such as a noncontact integrated circuit (IC) information carrier is mainly described. Moreover, these embodiments are applicable to noncontact information carriers such as a noncontact IC card and a noncontact IC information carrier, and a reader/writer thereof. Herein, the noncontact IC information carrier is not limited to card-shaped only.

First Exemplary Embodiment

A noncontact IC information carrier reader/writer in the first exemplary embodiment of the present invention is described with reference to FIG. 1 through FIG. 10.

Figure 1:
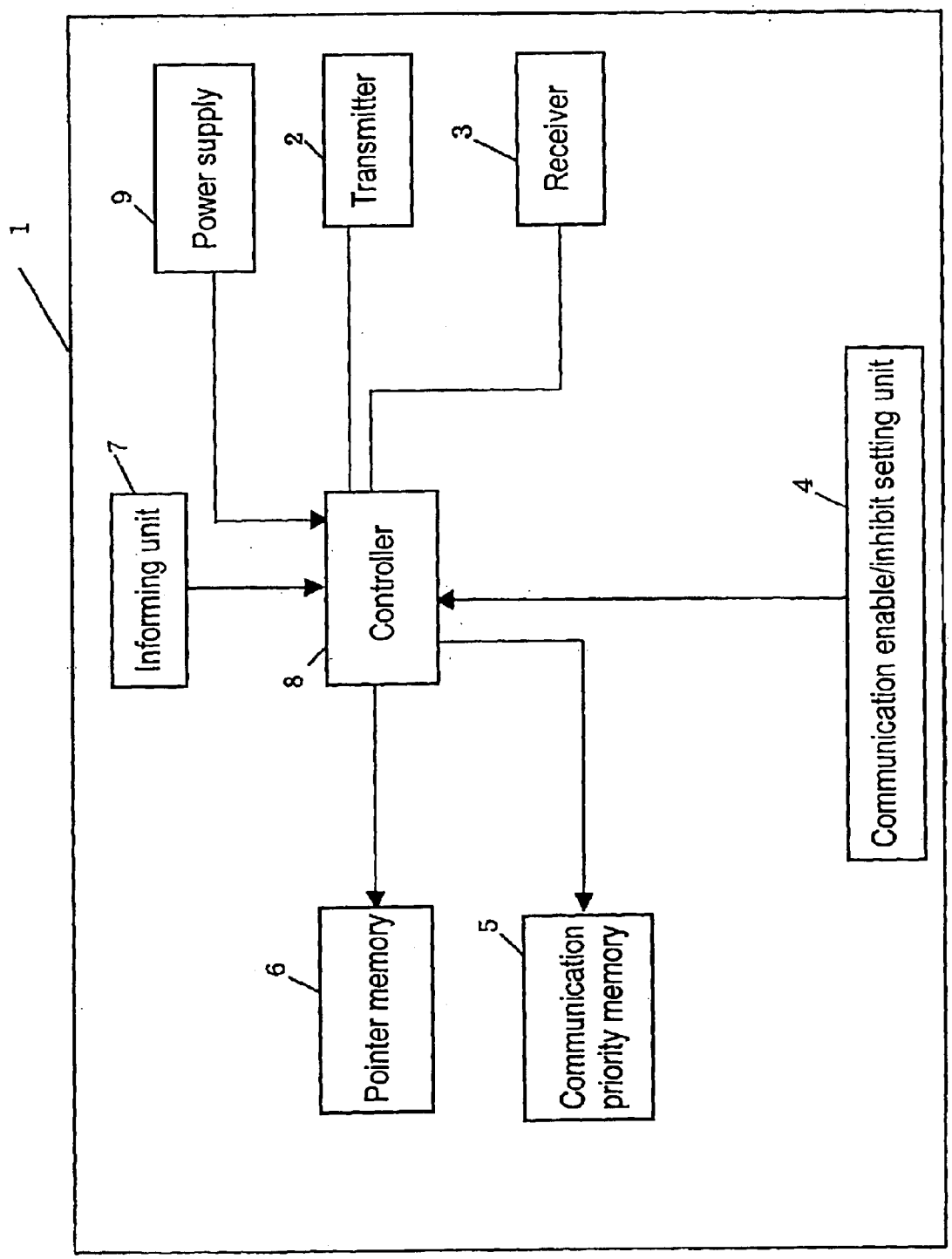
FIG. 1 is a block diagram of a functional configuration of a noncontact-IC-information-carrier reader/writer (hereinafter called reader/writer) in the first exemplary embodiment of the present invention.
Figure 3:
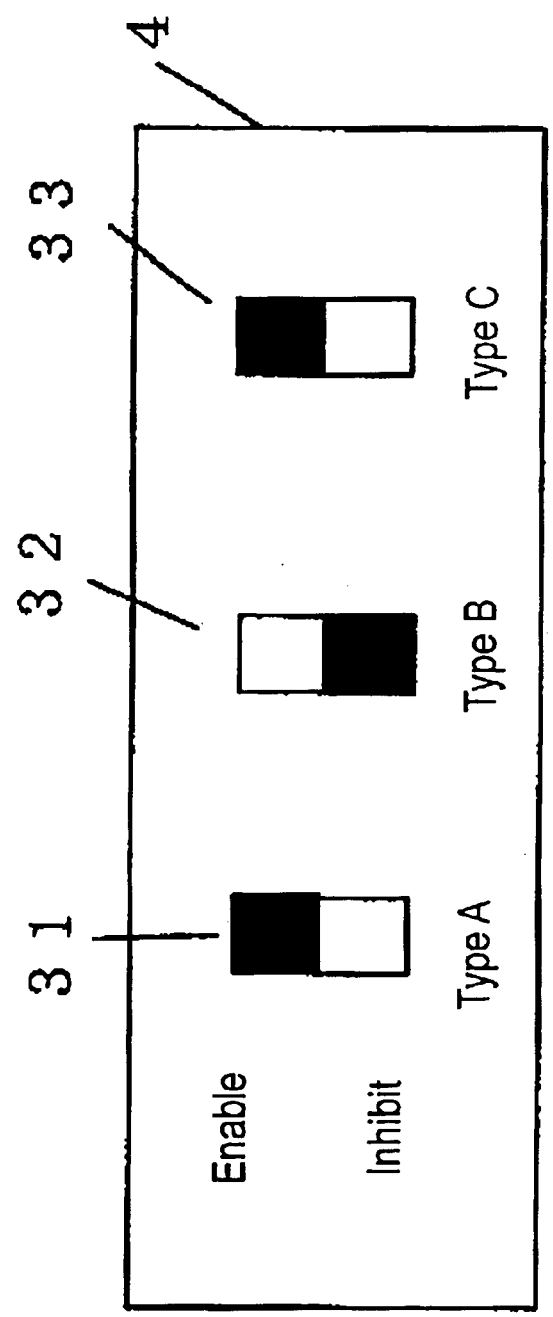
FIG. 3 is a schematic front view of a communication enable/inhibit setting unit of a reader/writer in the first exemplary embodiment of the present invention.

FIG. 1 is a block diagram showing functional configurations of a noncontact reader/writer for noncontact-IC-information-carrier in the first exemplary embodiment of the present invention. FIG. 2 illustrates a schematic view of a communication priority table of a reader/writer. FIG. 3 is a front view of a dual-in-line-package switch (DIP switch) employed as a communication enable/inhibit setting unit. FIG. 4 through 10 illustrate flowcharts of data processing when communications are made.

FIG. 1 shows noncontact reader/writer 1 used in the first exemplary embodiment of the present invention. Transmitter 2 sends signals such as a command to an information carrier such as a noncontact IC card or a noncontact-IC-information-carrier. Receiver 3 receives a signal such as a response from the information carrier. Communication enable/inhibit setting unit 4 sets enabling or inhibiting a communication between the noncontact reader/writer and each kind of noncontact information carrier.

Pointer memory 6 stores pointer values referring relevant lines in the communication priority table stored in communication priority memory 5.

Informing unit 7 informs controller 8 of a noncontact IC information carrier entering into an communication range of a noncontact reader/writer 1.

Controller 8, then receiving the notification from informing unit 7, determines a kind of noncontact IC information carrier to communicate with for next time, by using communication enable/inhibit setting unit 4, communication priority table 5 and pointer memory 6. Moreover, controller 8 allows transmitter 2 to send a command to the information carrier. When receiving the response through receiver 3, controller 8 allows power supply 9 to energize each unit constituting the reader/writer.

In the exemplary embodiment, a motion sensor works as informing unit 7 to detect a movement of the noncontact-IC-information-carrier. Lithium ion secondary battery works as power supply 9.

As shown in FIG. 2, the communication priority table includes communication priority pattern 21 and pointers 22 to show each pattern. For example, when pointer value is three, the communication priority means an order of types B, C and A. In the exemplary embodiment, suppose that the reader/writer can communicate with three kinds of noncontact-IC-information-carriers, i.e. type A, B and C.

Herein, type A represents ISO 14443 type A compliant information carrier, type B represents ISO 14443 type B compliant information carrier and type C represents ISO 15693 compliant information carrier.

As shown in FIG. 3, in the exemplary embodiment, communication enable/inhibit setting unit 4 employs a dual-in-line-package (DIP) switch.

In an example shown in FIG. 3, as for switches 31, 32 and 33, a topside switch position corresponds to a communication enable state, and a bottom side switch position corresponds to a communication inhibit state. Consequently, the reader/writer enables communication with a type A noncontact-IC-information-carrier, inhibits communication with type B, and enables communication with type C. FIGS. 4, 5, 6, 7, 8, 9 and 10 are flowcharts of data processing of controller 8, in the communication.

Suppose that a noncontact reader/writer communicates with a type C noncontact IC information carrier. First, a motion sensor as informing unit 7, informs controller 8 that unit 7 detects a noncontact IC information carrier is in a communication range of reader/writer 1. Controller 8, at the beginning of communication processing, determines the priority order of communication by reading a pointer value stored in pointer memory 6 (S101).

Next, suppose that the pointer value stored in pointer memory 6 is 0. Then, processing goes to "A", and according to the flow shown in FIG. 4, communication processing is carried out and the stored data in the pointer memory is rewritten.

Suppose that communication enable/inhibit setting unit 4, a DIP switch, is set as follows:

for a noncontact-IC-information-carrier type A, the setting is in a communicate enable state, for a noncontact-IC-information-carrier type B, the setting is in a communication inhibit state, and for a noncontact-IC-information-carrier type C, the setting is in a communicate enable state.

Herein, controller 8 reads a setting of communication enable/inhibit setting unit 4. The setting is for enabling communication with type A (S111).

Then, assuming the noncontact-IC-information-carrier as type A, controller 8 allows transmitter 2 to send a command relevant to type A (S112).

Controller 8, however, fails in communication since the noncontact IC information carrier being in the communication range of the reader/writer is type C (113).

Next, controller 8 reads a setting of communication enable/inhibit setting unit 4. Controller 8 does not communicate, since the setting is for inhibiting communication with type B (S114).

Next, controller 8 reads a setting of unit 4. The setting is for enabling communication with type C (S115). Then, assuming the noncontact-IC-information-carrier as type C, controller 8 allows transmitter 2 to send the command relevant to type C (S116). Receiver 3 can receive the response from the information carrier since the noncontact IC information carrier in the communication range of reader/writer is a type C noncontact IC information carrier (S117). After that, controller 8 stores a pointer value to determine a priority order for next communication, after finishing required communication processing, i.e., reading-in information from the information carriers, in this exemplary embodiment.

In the present exemplary embodiment, pointer memory 6 stores a pointer value 4, so that type C noncontact-IC-data-carrier just finished communication is at the first priority followed by type A and type B in order (S118).

Due to this processing, when the type C noncontact-IC-information-carrier enters into an communication range of reader/writer 1 in the next communication, the reader/writer can perform a high speed read-in processing, since the type C noncontact-IC-information-carrier is assigned as the first priority order.

Herein, as an example of how a noncontact IC information carrier is used, suppose that a company publishes a type B noncontact-IC-information-carrier with awards for payment. In such a case, the type B noncontact IC information carrier will be used more frequently than other types capable of payment. Type B noncontact IC information carrier, therefore, is assigned the first priority (pointer value=2). Accordingly the reader/writer of the present exemplary embodiment can perform processing in a shorter time with noncontact IC information carrier. That is, a speedy processing is implemented.

Figure 5:
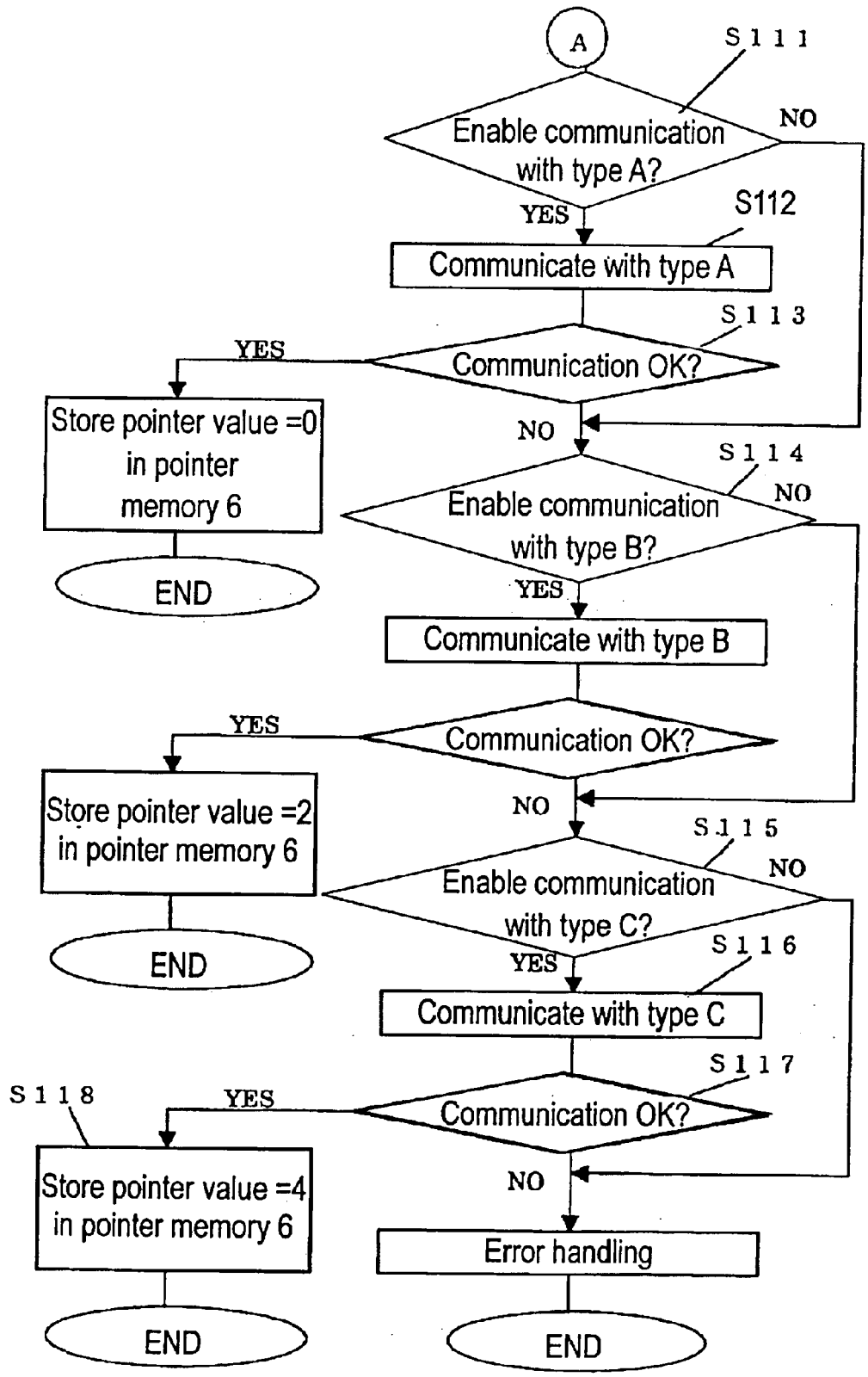
FIG. 5 is a flowchart of communication processing of a reader/writer in the first exemplary embodiment of the present invention.

As described above, when the pointer value of communication priority table 5 is 0, reader/writer 1 carries out communication processing based on the flow shown in FIG. 5.

Figure 4:
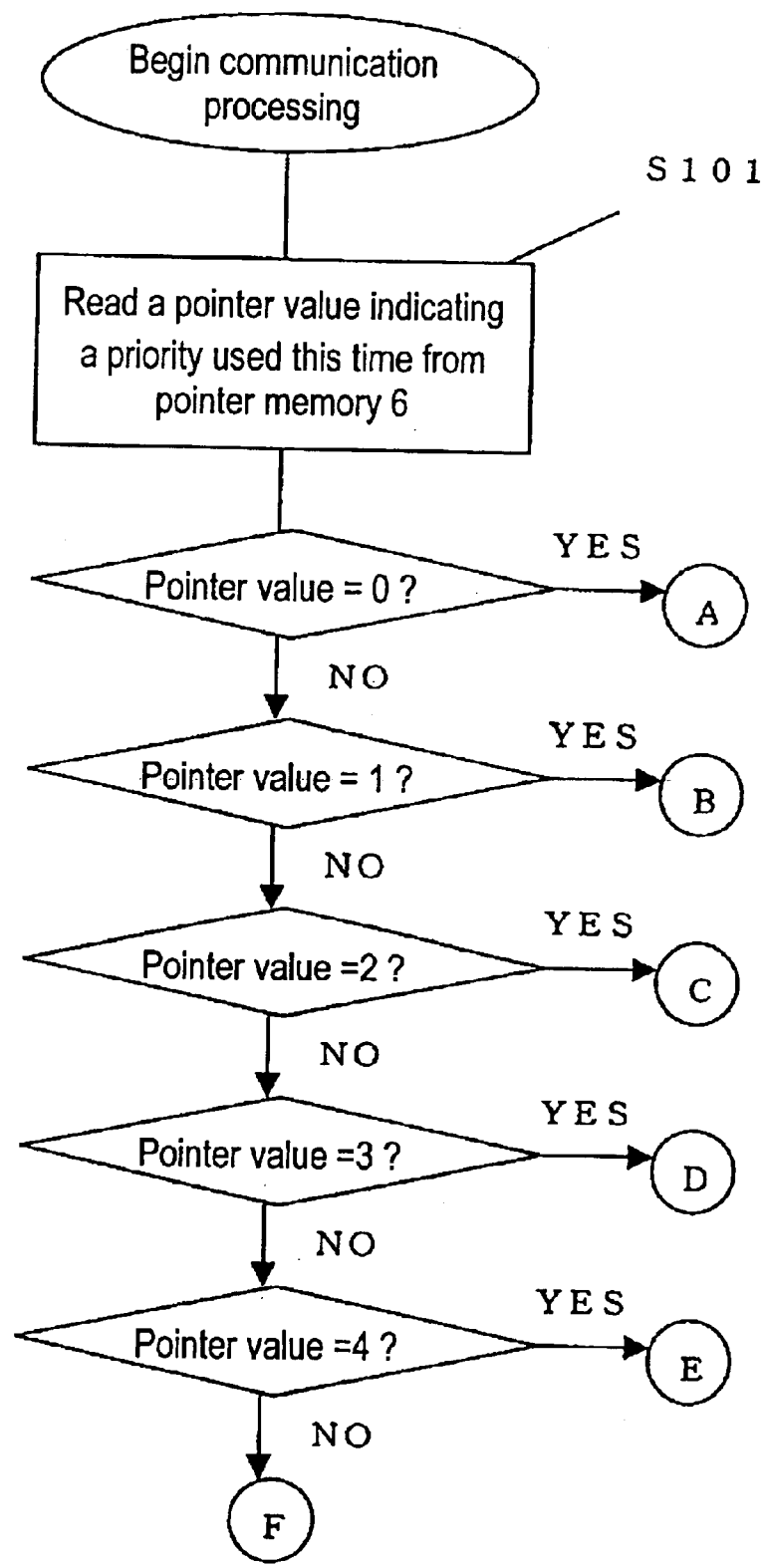
FIG. 4 is a flowchart of communication processing of a reader/writer used in the first exemplary embodiment of the present invention.
Figure 6:
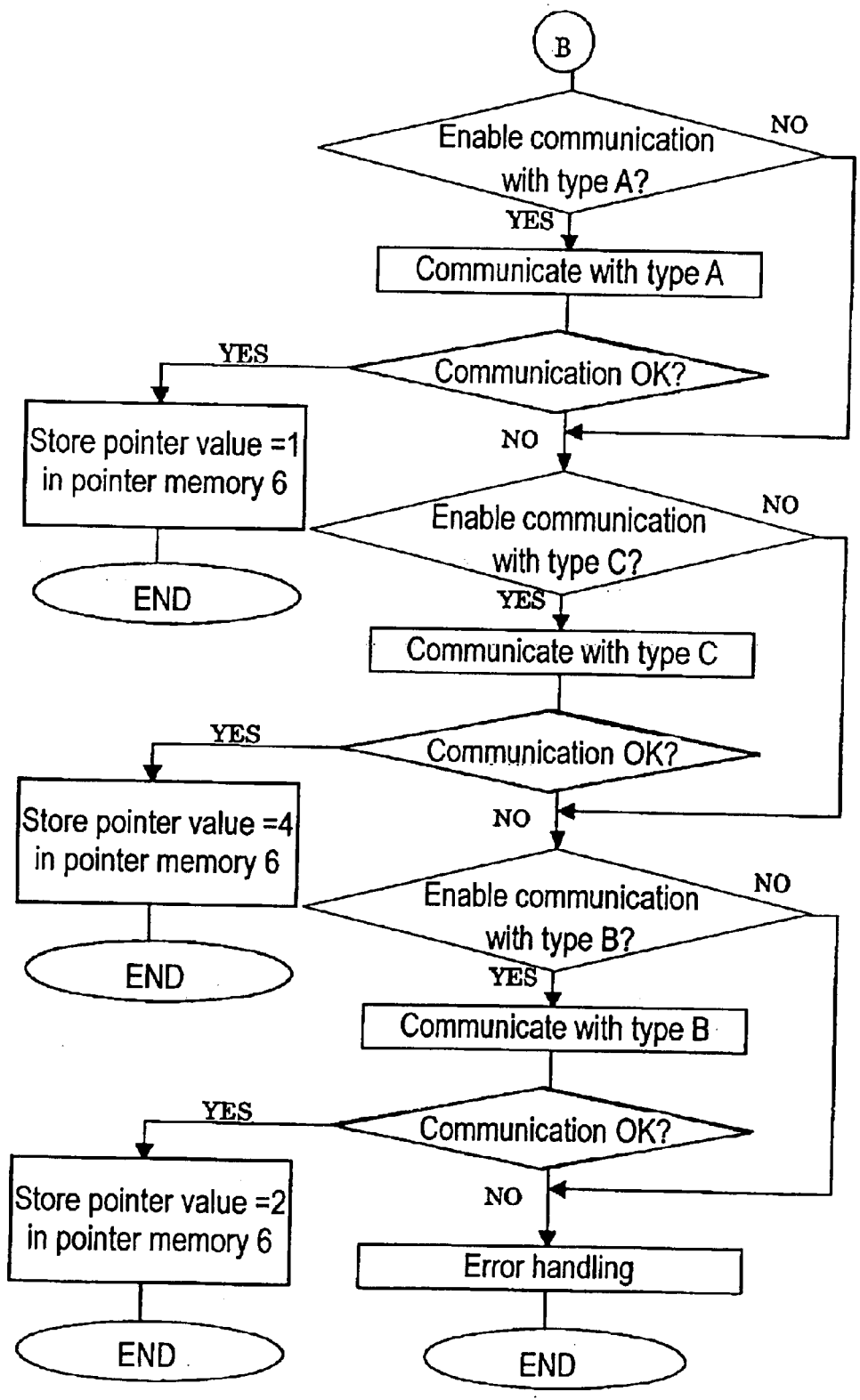
FIG. 6 is a flowchart of communication processing of a reader/writer in the first exemplary embodiment of the present invention.

When the pointer value of communication priority table 5 is 1, processing goes to "B" in FIG. 4, i.e. to the flow shown in FIG. 6. Noncontact reader/writer 1 carries out communication processing based on the flow shown in FIG. 6 and rewrites data in the pointer memory.

Figure 7:
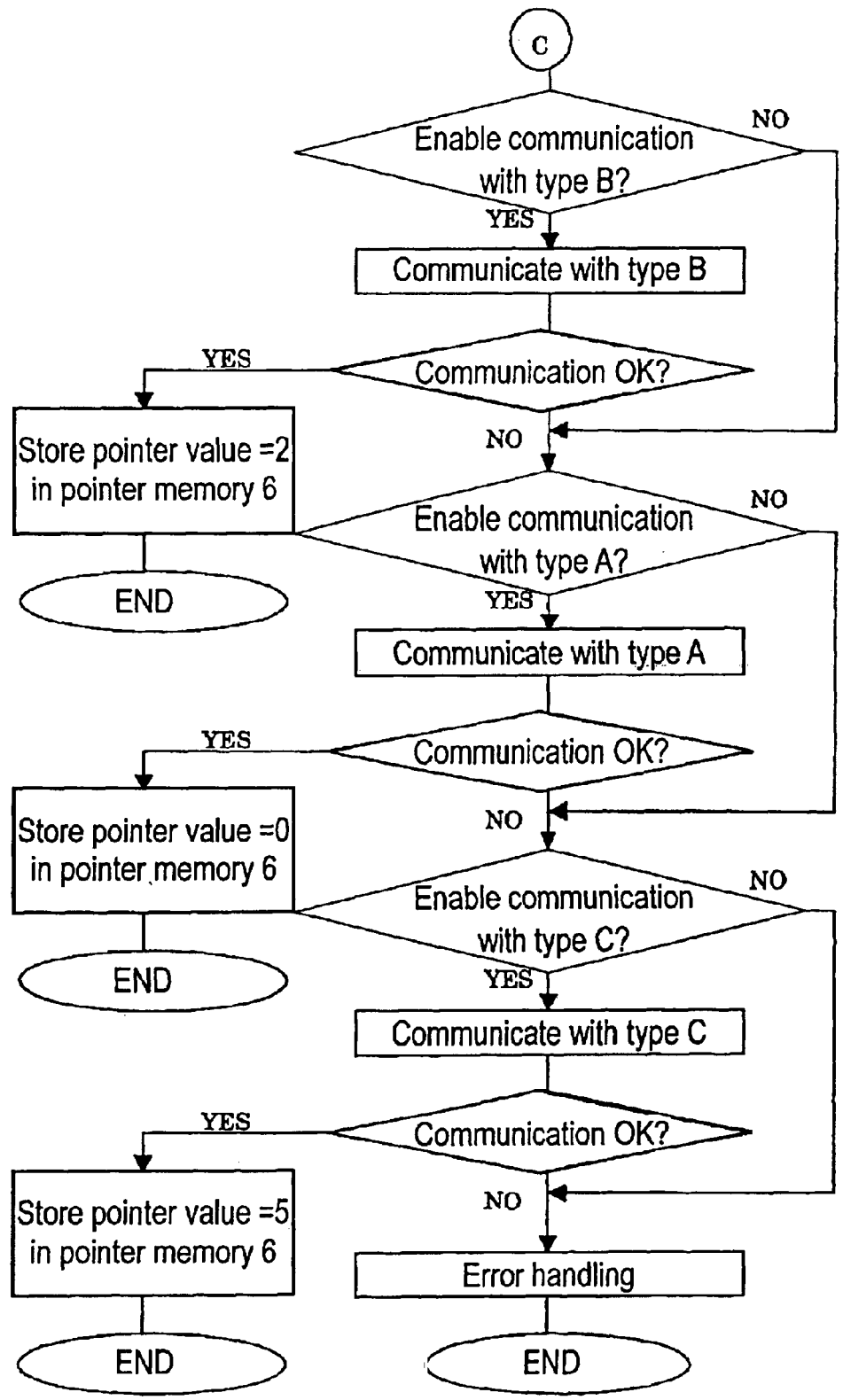
FIG. 7 is a flowchart of communication processing of a reader/writer in the first exemplary embodiment of the present invention.

When the pointer value of communication priority table 5 is 2, data processing goes to "C" in FIG. 4, i.e. to the flow shown in FIG. 7.

Figure 8:
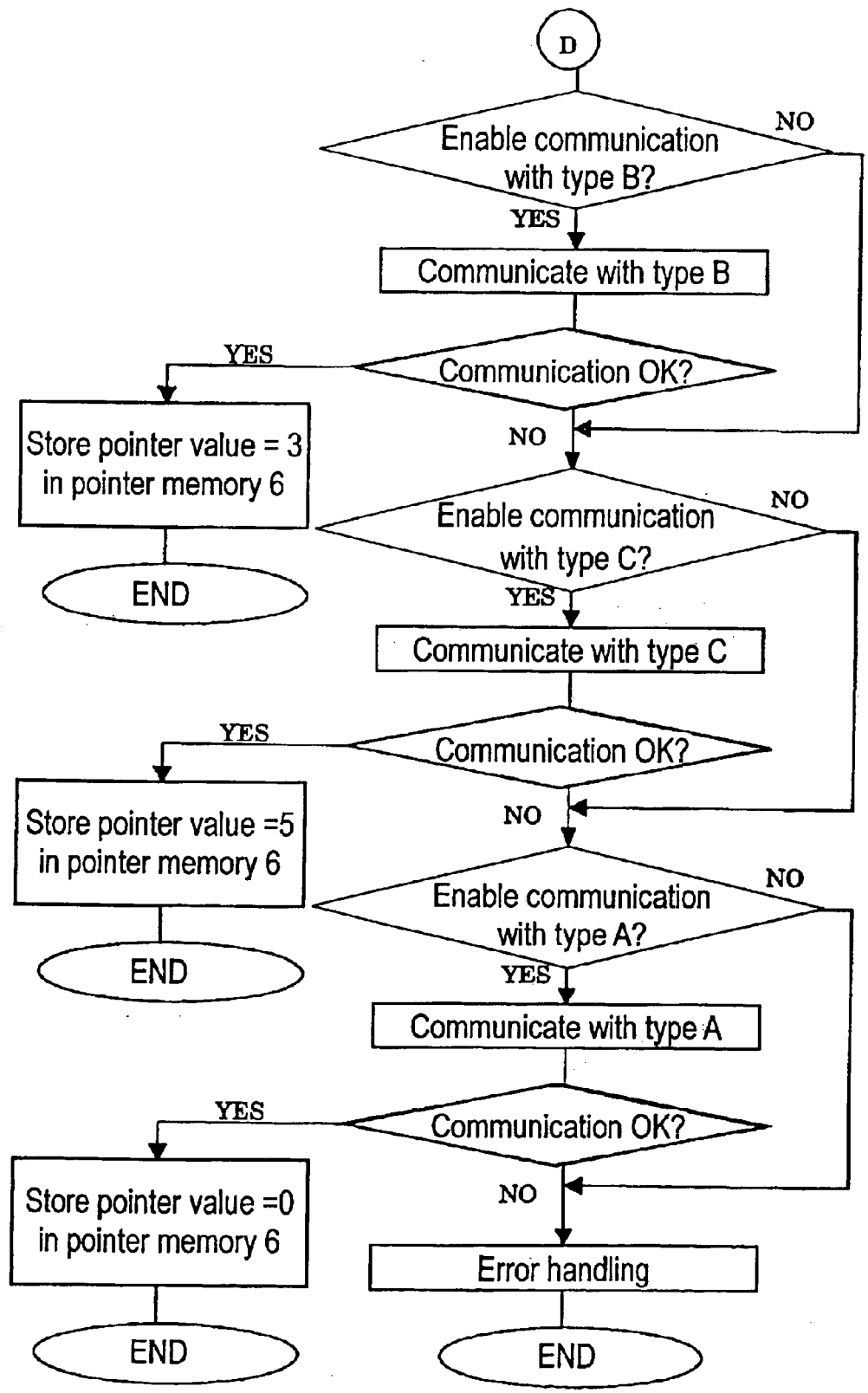
FIG. 8 is a flowchart of communication processing of a reader/writer in the first exemplary embodiment of the present invention.

When the pointer value is 3, data processing goes to "D" in FIG. 4, i.e. to the flow shown in FIG. 8.

Figure 9:
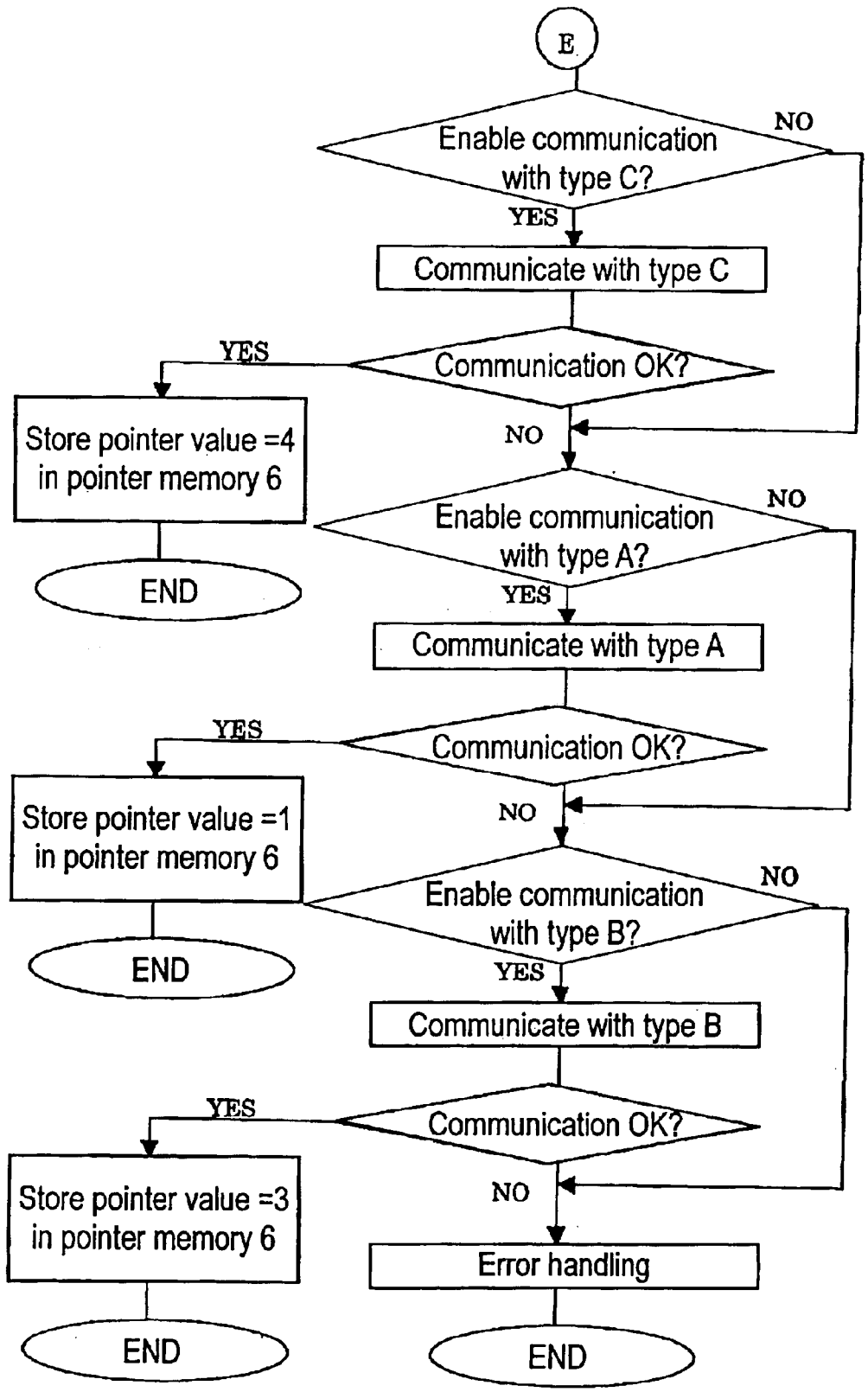
FIG. 9 is a flowchart of communication processing of a IC-information-carrier reader/writer in the first exemplary embodiment of the present invention.

When the pointer value is 4, data processing goes to "E" in FIG. 4, i.e. to the flow shown in FIG. 9.

Figure 10:
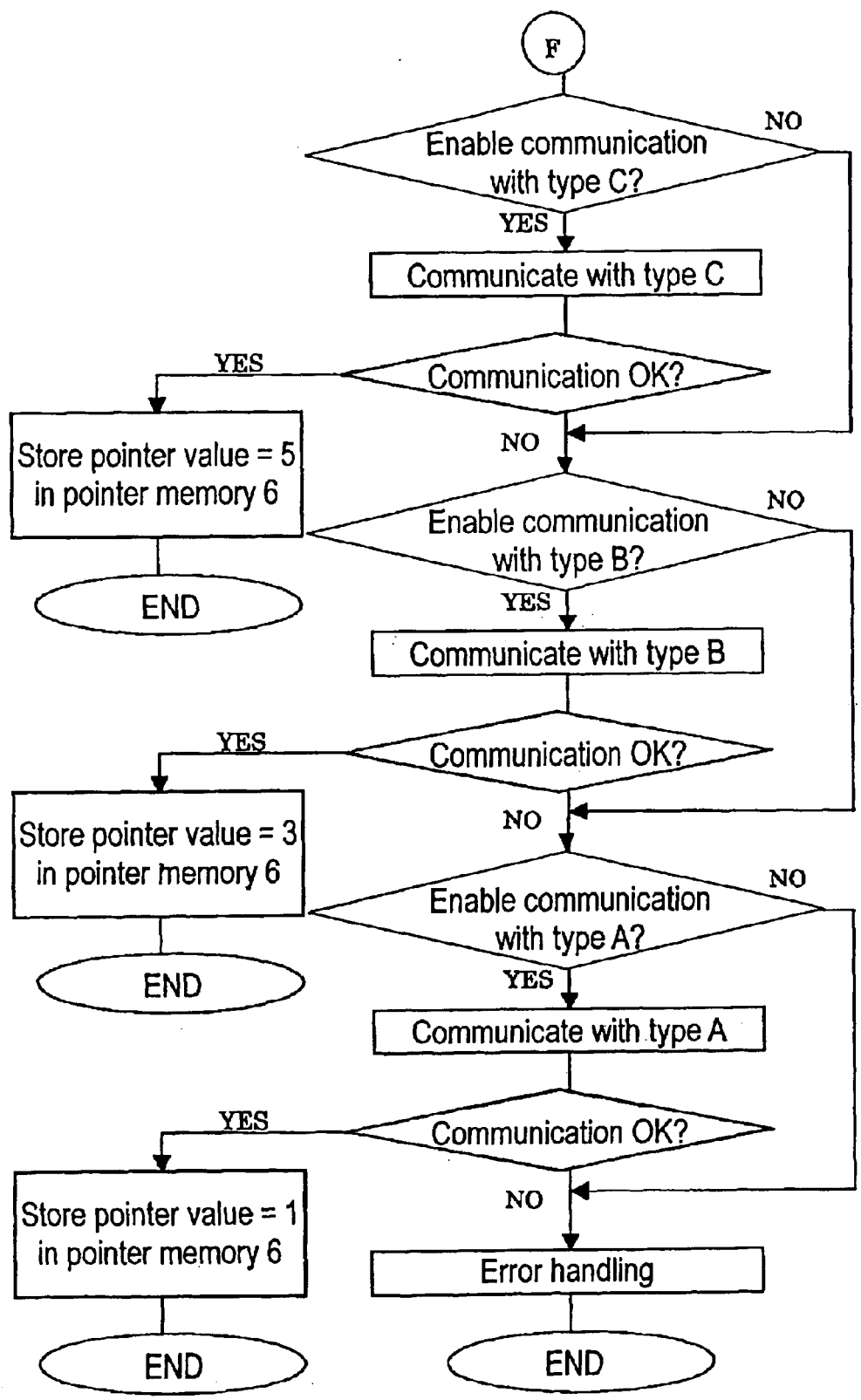
FIG. 10 is a flowchart of communication processing of a reader/writer in the first exemplary embodiment of the present invention.

Moreover, when the pointer value is not any one of 0 through 4, data processing goes to "F" in FIG. 4, i.e. to the flow shown in FIG. 10.

As described above, after finishing the last communication, the noncontact reader/writer in the present exemplary embodiment determines the priority order for next communication, based upon data on the current priority order in the communication processing and on the kind of noncontact-IC-data-carrier with which the reader/writer has communicated. Accordingly, in next time, the noncontact reader/writer can carry out speedily the communication processing with a noncontact IC information carrier.

In addition to the above, the reader/writer includes the communication enable/inhibit setting unit to provide enable or inhibit settings for each kind of noncontact information carrier. The reader/writer, therefore, can inhibit communication with unnecessary kind of noncontact information carrier. This further enables a speedy communication processing.

Moreover, in the present exemplary embodiment, pointer memory 6 employs an Electrical Erasable Programming ROM (EEPROM), as a non-volatile memory. The unit can hold communication priority order kept unchanged for a next communication, even if power supply 9 stops. After recovery of power supply 9, therefore, the reader/writer performs a speedy communication with the same kind of noncontact information carrier as the previous communication.

In addition, in the present exemplary embodiment, power supply 9 employs Lithium ion secondary battery. A shortened communication time reduces power consumption of battery used for power supply 9, thereby resulting a longer battery life. As a result, a longer continuous operating time is realized.

Moreover, in the present exemplary embodiment, communication enable/inhibit setting unit 4 employs a DIP switch. Communication from other units or a predetermined noncontact IC information carrier for settings may be used to set enabling or inhibiting communication.

Additionally, in the present exemplary embodiment, pointer memory 6 employs EEPROM. Other non-volatile memories such as Ferroelectric Random Access Memory (FeRAM) may also be used for the purpose.

Second Exempary Embodiment

The reader/writer in the second exemplary embodiment of the present invention is explained with reference to FIG. 11 through FIG. 20.

Figure 11:
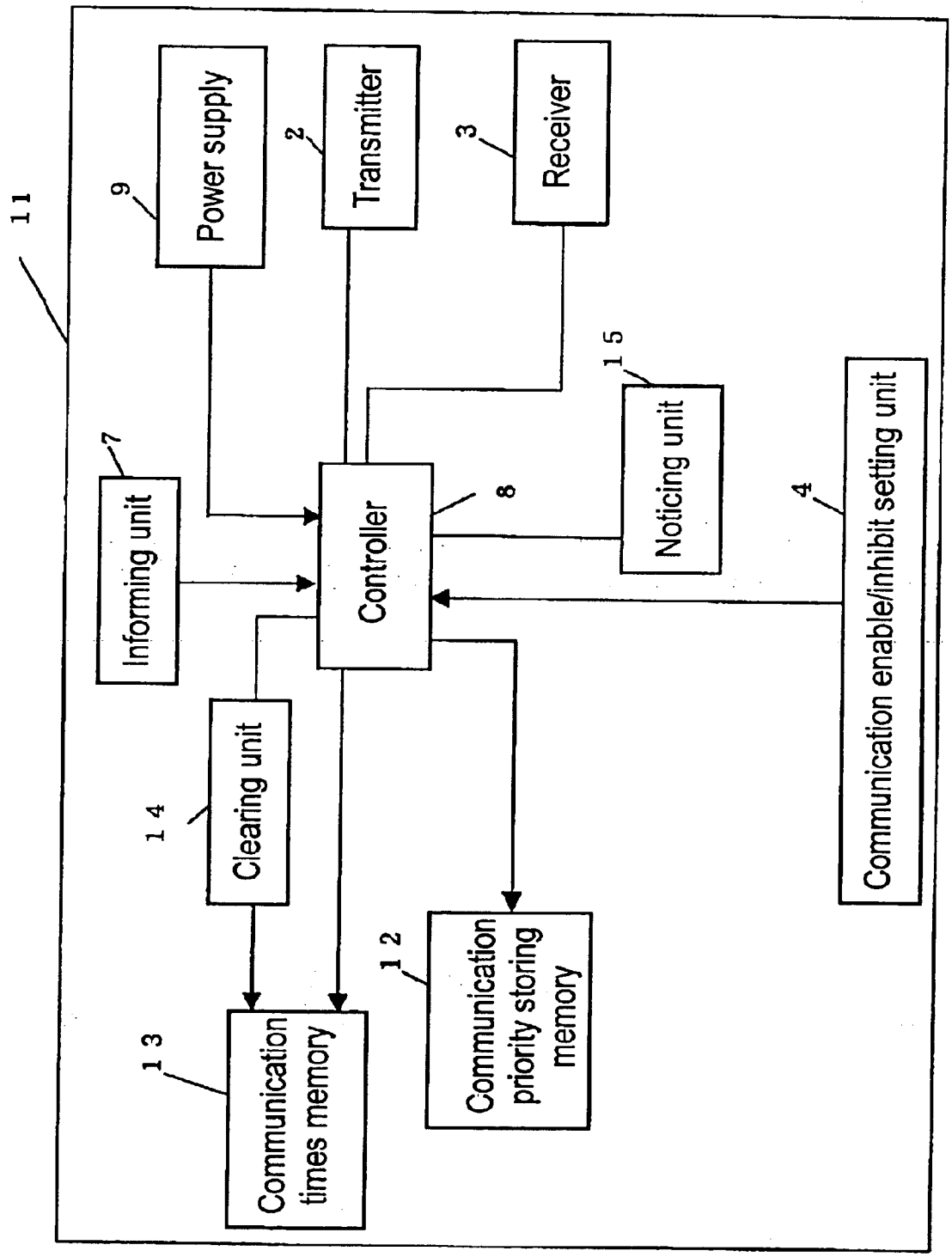
FIG. 11 is a block diagram of a functional configuration of a reader/writer in the second exemplary embodiment of the present invention.
Figure 12:
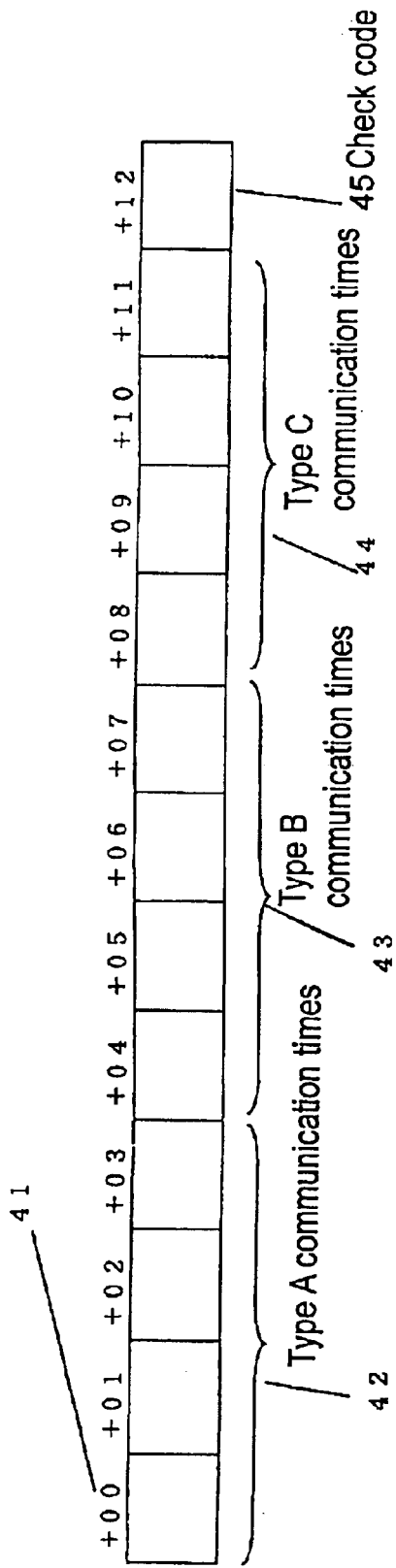
FIG. 12 is a schematic view of a configuration of a communication times memory of a reader/writer in the second exemplary embodiment of the present invention.

FIG. 11 illustrates a block diagram of a functional configuration of a reader/ writer. FIG. 12 illustrates a schematic view of a configuration of a communication times memory of a reader/writer. FIG. 13 through FIG. 20 illustrate flowcharts of communication processing of reader/writers.

The reader/writer in the second exemplary embodiment of the present invention can also communicate with three kinds of noncontact-IC-information-carriers, i.e. types A, B and C. Herein, type A represents ISO 14443 type A compliant information carrier, type B represents ISO 14443 type B compliant information carrier and type C represents ISO 15693 compliant information carrier.

FIG. 11 shows reader/writer 11 in the second exemplary embodiment of the present invention. Transmitter 2 sends a command to the information carrier. Receiver 3 receives a response from the information carrier. Communication enable/inhibit setting unit 4 makes communication enable or inhibit settings to communicate with each kind of noncontact IC information carriers.

Communication priority storing memory 12 stores a priority order within types A, B and C noncontact IC information carriers with which reader/writer 11 communicates.

Communication times memory 13 stores a number of communication times of reader/writer 11 with respect to each kind of noncontact IC information carrier. Clearing unit 14 clears stored data in communication, times memory 13. Informing unit 7 informs controller 8 of a noncontact-IC information-carrier entering into a communication range of reader/writer 11.

Controller 8, upon receiving the information from informing unit 7, determines a kind of noncontact-IC-information-carrier with which reader/writer 11 communicates in next time, by using communication enable/inhibit setting unit 4 and communication priority storing memory 12. Additionally, controller 8 allows transmitter 2 to send a command to the information-carrier and receives a response through receiver 3. Noticing unit 15 informs abnormality to the outside.

Power supply 9 energizes each unit constituting reader/writer 11. In this exemplary embodiment, a motion sensor is used for informing unit 7 and a Lithium ion secondary battery is used for power supply 9.

In addition, in this exemplary embodiment, like the first exemplary embodiment, communication enable/inhibit setting unit 4 employs a DIP switch as shown in FIG. 3.

FIG. 12 shows a secured area in address 41 of communication times memory 13.

Area 42 stores a number of communication times with type A noncontact-IC-information-carrier. Area 43 stores a number of communication times with type B noncontact-IC-information-carrier. Area 44 stores a number of communication times with type C noncontact-IC-information-carrier.

In this exemplary embodiment, each of areas 42, 43 and 44 secures an area of 4 bytes. In each communication, the number of communication times is increased by one for each kind of noncontact-IC-information-carriers. The each number is saved in area 42, 43 and 44 in binary value. Supposing that communication is made every one second, this 4 bytes area has enough capacity to count the communication times over 130 years. Check code 45 is provided to check whether data stored in communication times memory 13 are correct. In this exemplary embodiment, the exclusive OR (EOR) of each bytes, i.e. addresses +00 through +11 are used.

In the present exemplary embodiment, communication times memory 13 employs an Electrical Erasable Programming ROM (EEPROM), which is a nonvolatile memory. Contents of the communication times memory can be kept unchanged, if power from power supply 9 stops.

Moreover, in this second exemplary embodiment, controller 8 of reader/writer 11, just after the start, reads out the contents of communication times memory 13 to detect validity of check code 45 for determining whether the information carrier is valid. If the check code is invalid, reader/writer 11 informs an abnormality to the outside by noticing unit 15, after judging that there are a certain abnormalities in communication times memory 13. In this second exemplary embodiment, the noticing unit employs a red Light Emitting Diode (LED) with a driving circuit. The red LED blinks at the time of abnormalities.

FIGS. 13, 14, 15, 16, 17, 18, 19, 20 show flows of data processing of controller 8 in the communication.

The settings of DIP switch as communication enable/inhibit setting unit 4, are as follows:

for a type A noncontact IC information carrier, the setting is in a communication enable state, for type B noncontact IC information carrier, the setting is in a communication inhibit state, and for type C noncontact IC information carrier, the setting is in a communication enable state.

Suppose that numbers of communication times stored in communication times memory 13 for each kind of noncontact IC information carrier are ten (10) times for type A, three (3) times for type B and one (1) time for type C, respectively.

Figure 13:
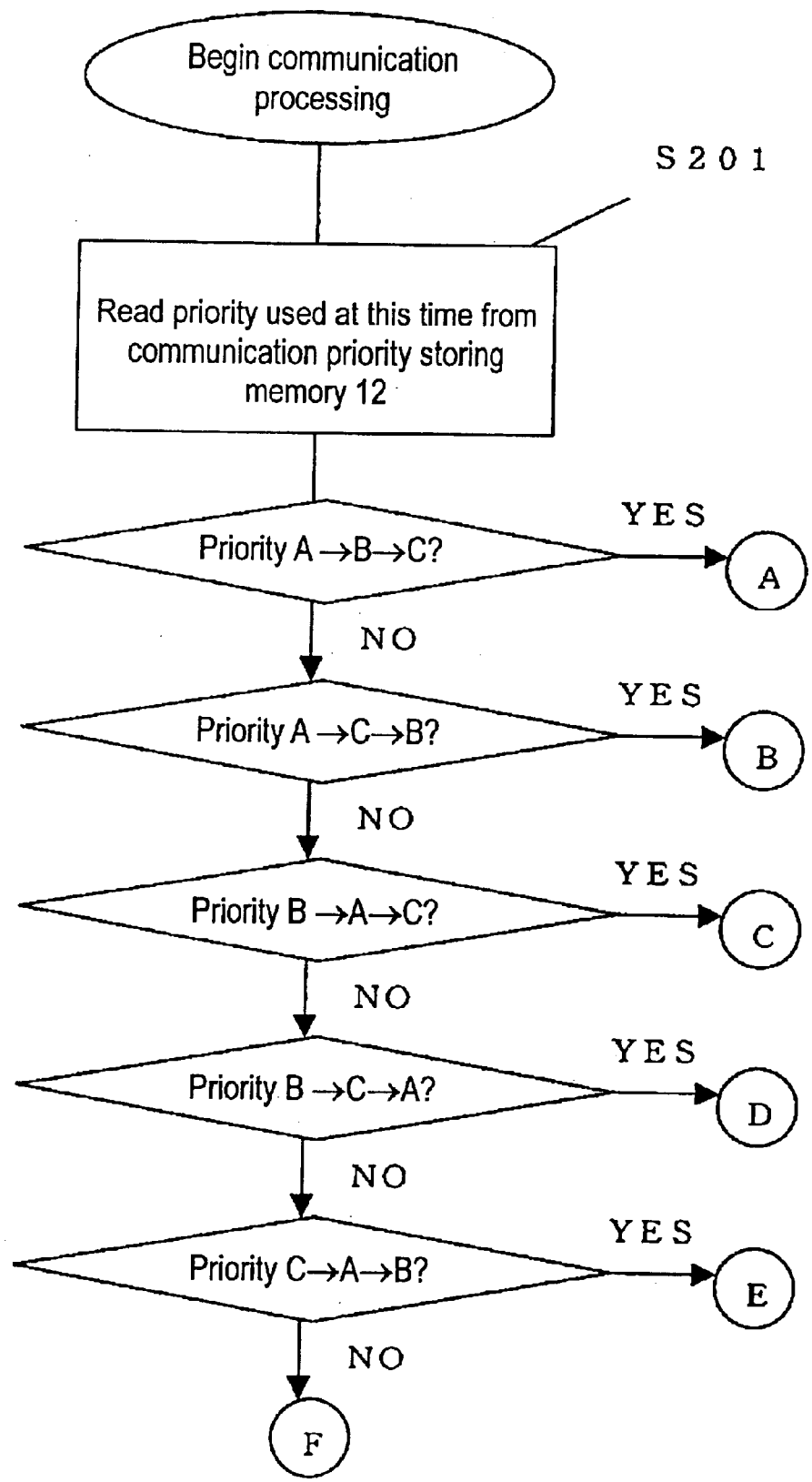
FIG. 13 is a flowchart of communication processing of a noncontact IC-information-carrier reader/writer in the second exemplary embodiment of the present invention.
Figure 14:
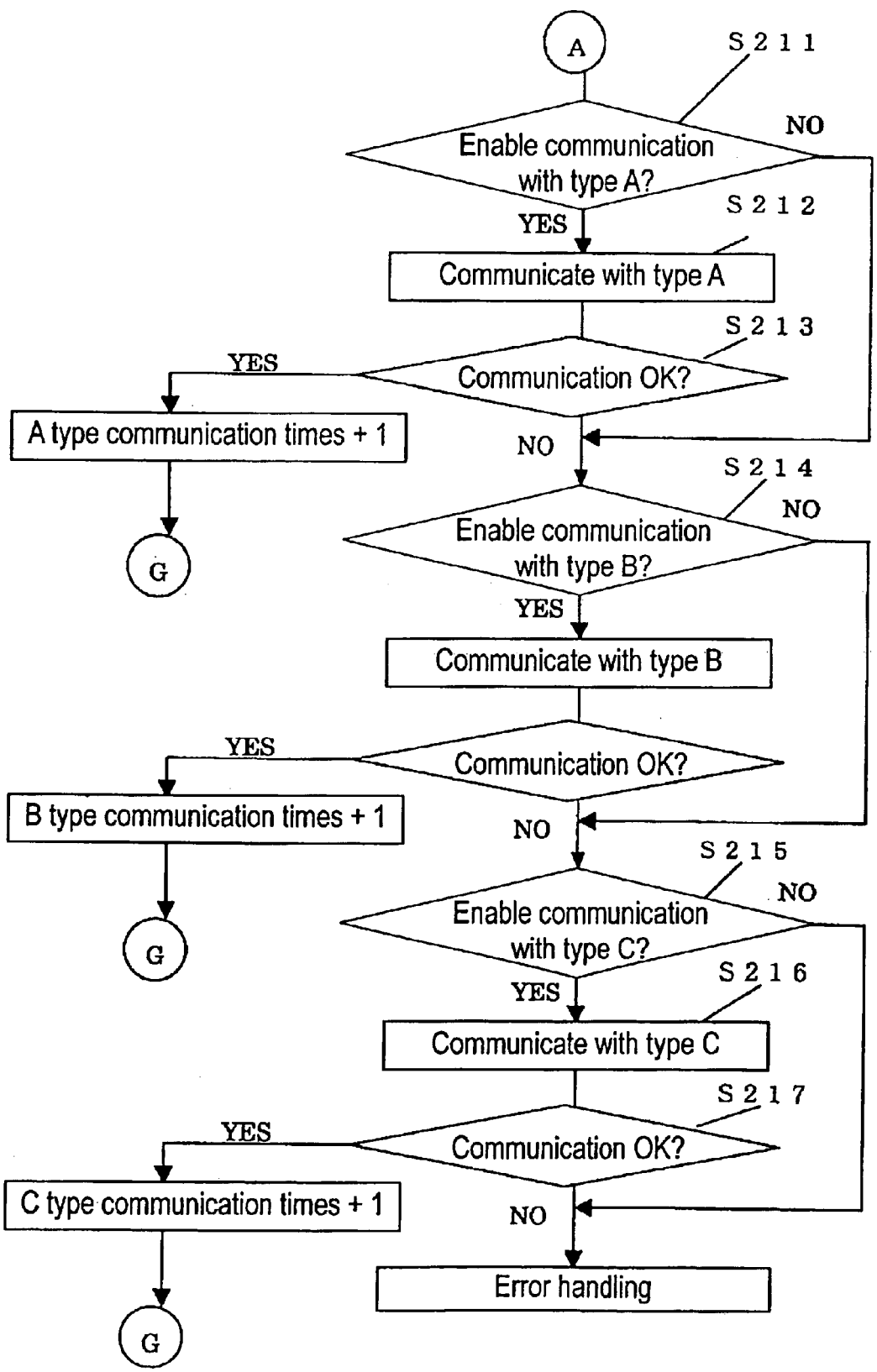
FIG. 14 is a flowchart of communication processing of a reader/writer in the second exemplary embodiment of the present invention.

In addition, if the priority order stored in communication priority storing memory 12 is in the order of type A, B and C, processing goes to "A" in FIG. 13, i.e. "A" in FIG. 14. And data processing is carried out according to the flow shown in FIG. 14, Similarly, the following data processing is carried out according to the priority order stored in communication priority storing memory 12.

Figure 15:
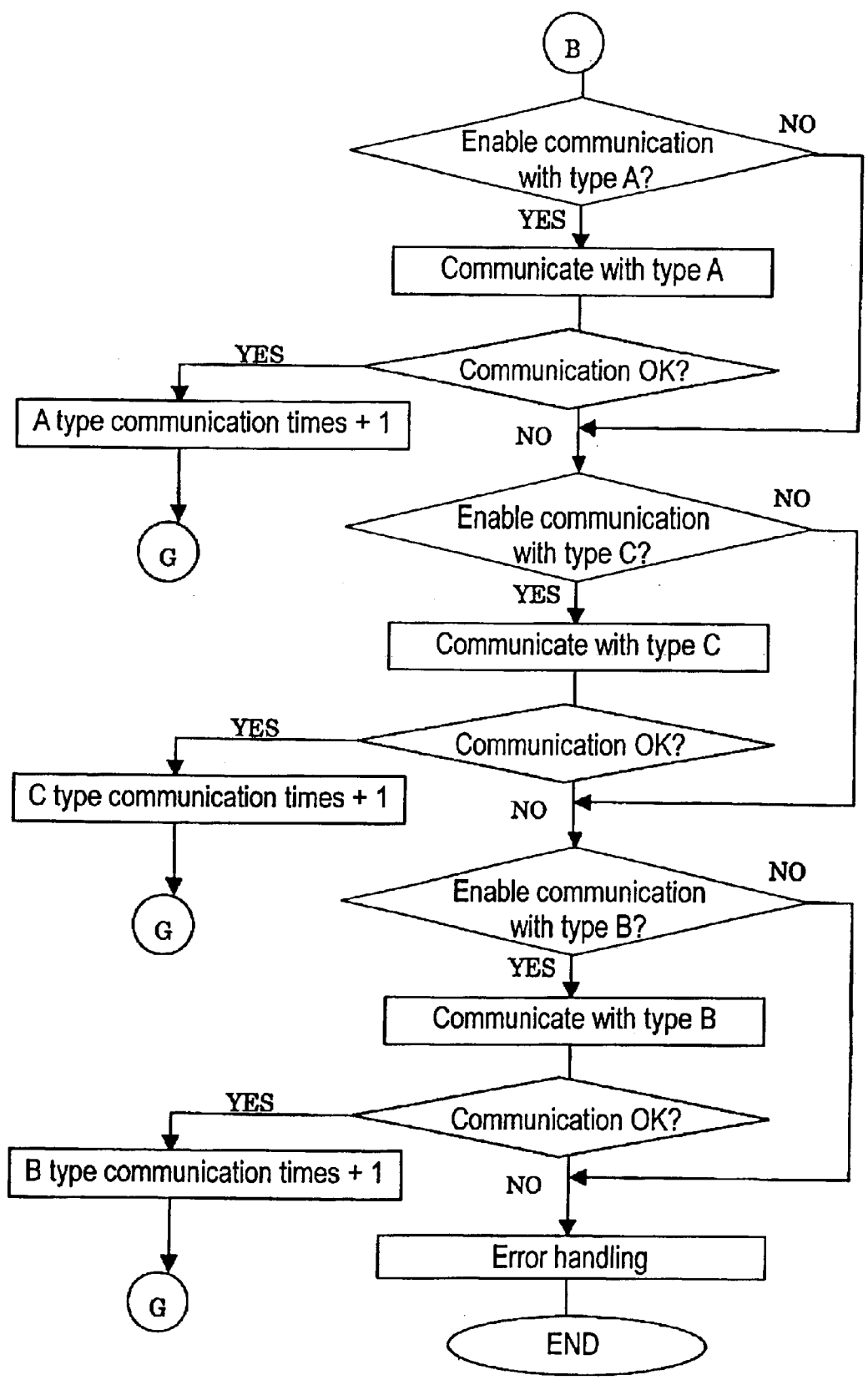
FIG. 15 is a flowchart of communication processing of a reader/writer in the second exemplary embodiment of the present invention.

In case of the priority order of A, C and B, processing goes to "B" in FIG. 13, i.e. "B" in FIG. 15. Data processing is carried out according to the flow shown in FIG. 15.

Figure 16:
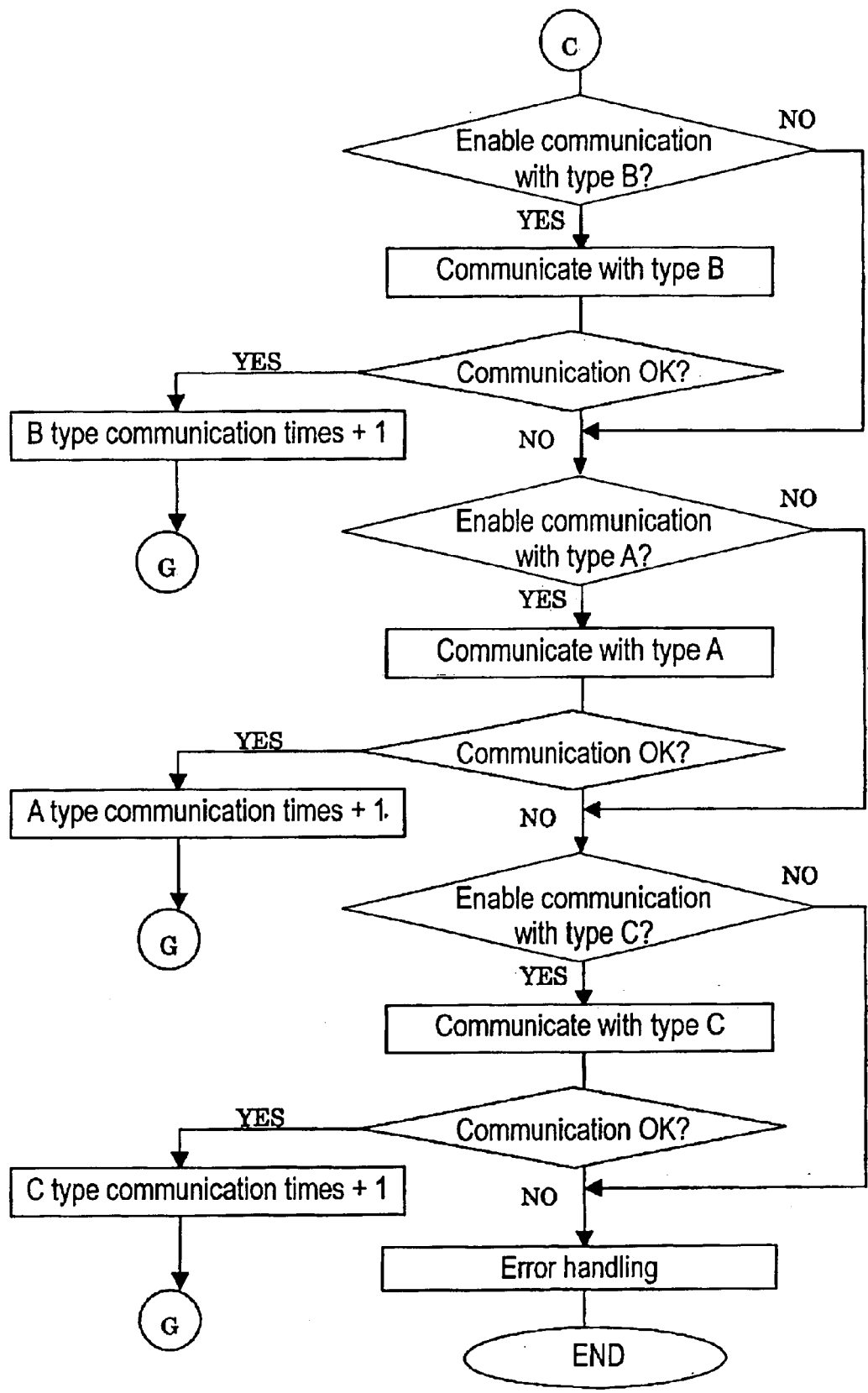
FIG. 16 is a flowchart of communication processing of a reader/writer in the second exemplary embodiment of the present invention.

In case of the priority order of B, A and C, processing goes to "C" in FIG. 13, i.e. "C" in FIG. 16. Data processing is carried out according to the flow shown in FIG. 16.

Figure 17:
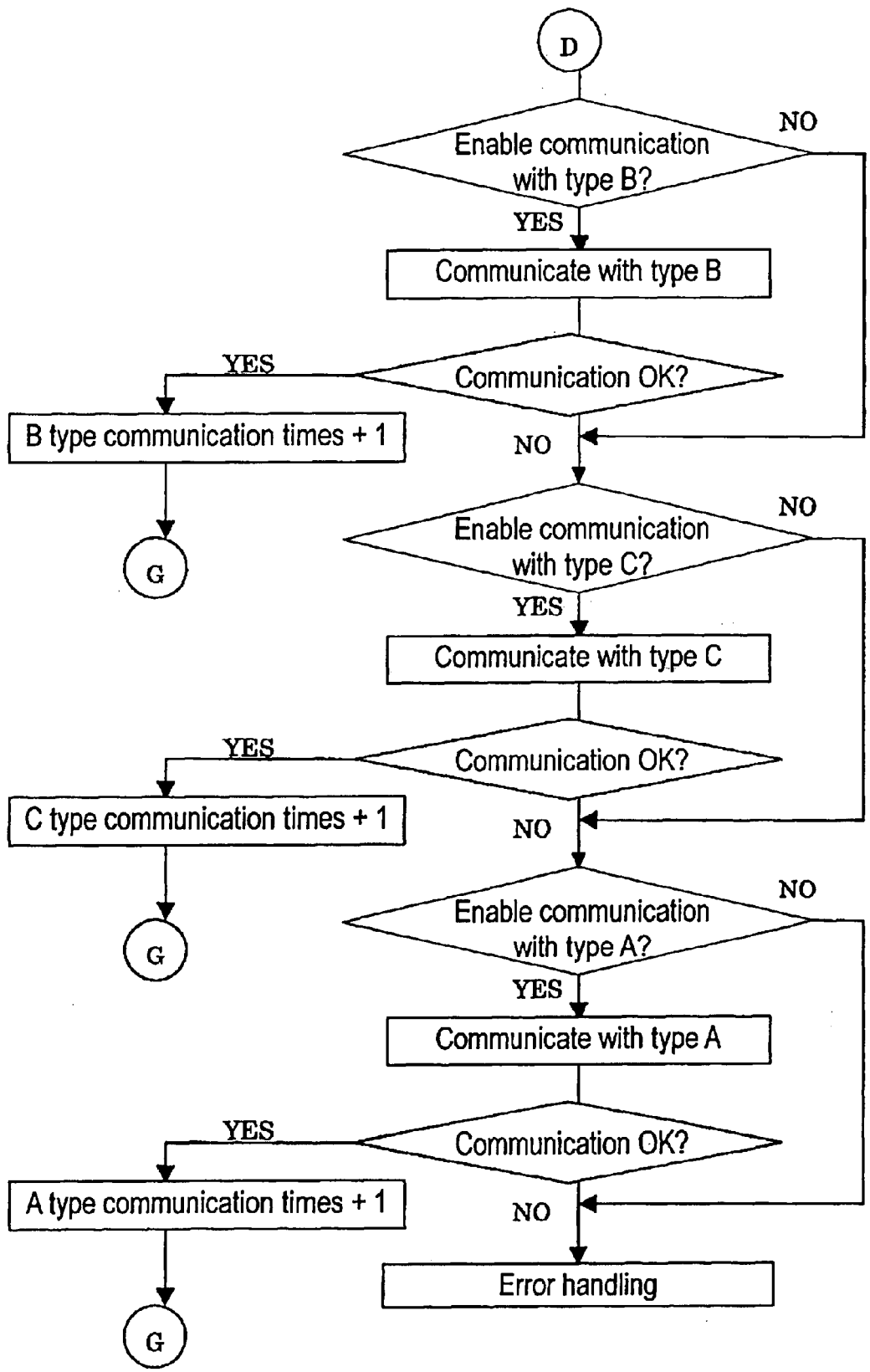
FIG. 17 is a flowchart of communication processing of a reader/writer in the second exemplary embodiment of the present invention.

In case of the priority order of B, C and A, processing goes to "D" in FIG. 13, i.e. "D" in FIG. 17. Data processing is carried out according to the flow shown in FIG. 17.

Figure 18:
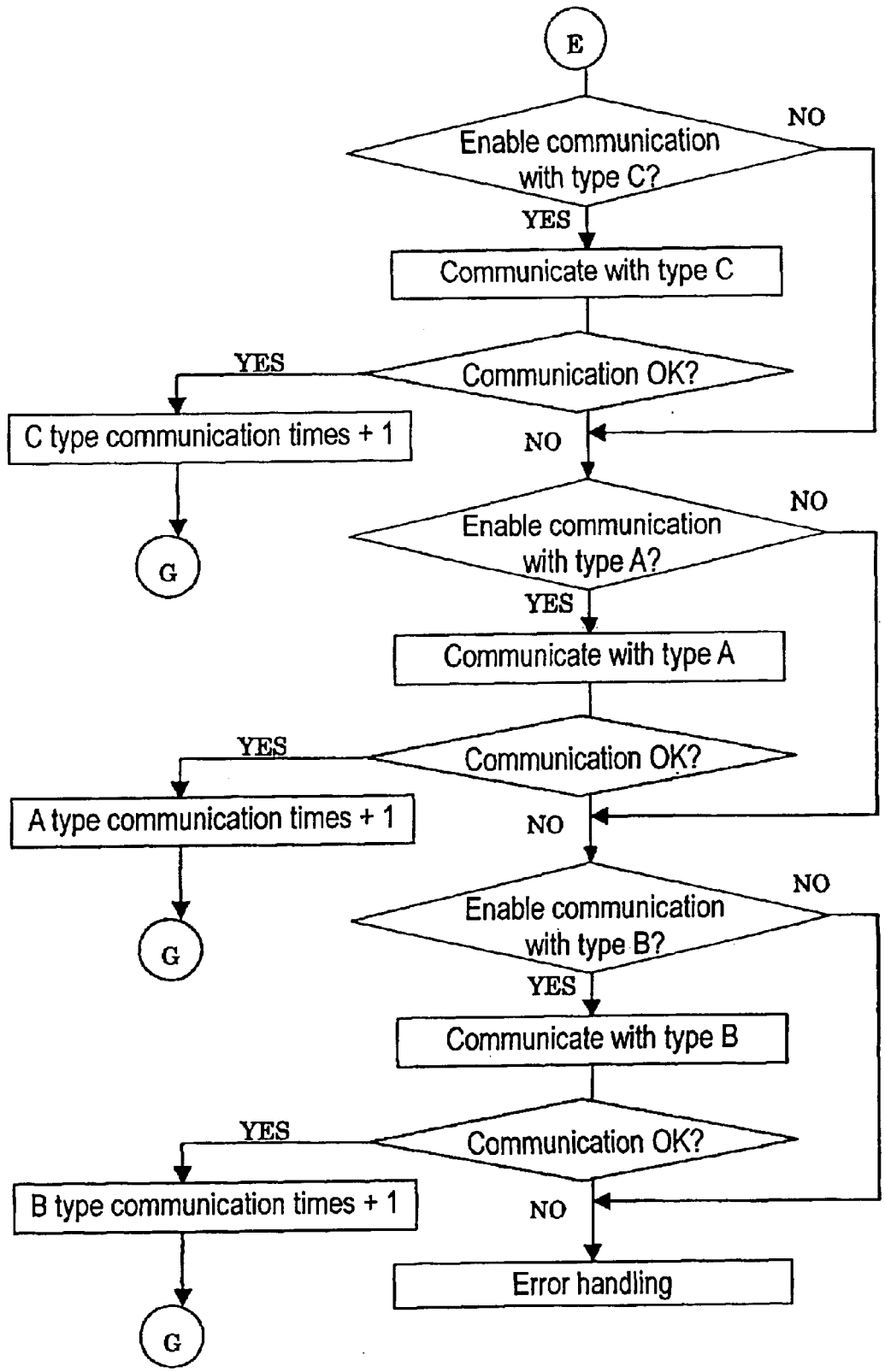
FIG. 18 is a flowchart of communication processing of a reader/writer in the second exemplary embodiment of the present invention.

In case of the priority order of C, B and A, processing goes to "E" in FIG. 13, i.e. "E" in FIG. 18. Data processing is carried out according to the flow shown in FIG. 18.

Figure 19:
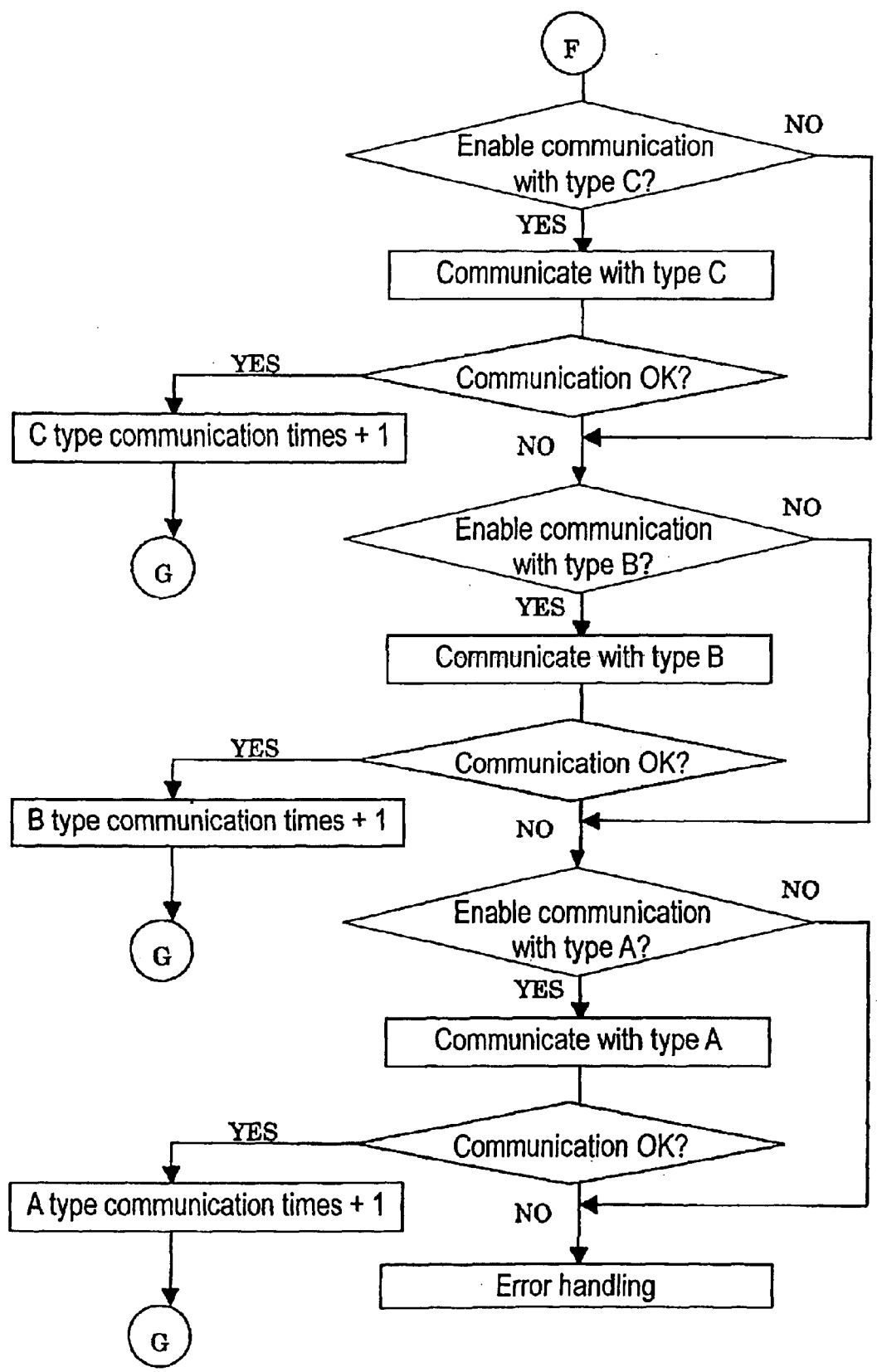
FIG. 19 is a flowchart of communication processing of a reader/writer in the second exemplary embodiment of the present invention.

In case of the priority order of C, A and B, processing goes to "F" in FIG. 13, i.e. "F" in FIG. 19. Data processing is carried out according to the flow shown in FIG. 19.

First, informing unit 7, a motion sensor, detects a noncontact-IC-information-carrier, when it enters in a communication range of reader/writer 11. Next, informing unit 7 informs controller 8 of a noncontact-IC-information-carrier being in a communication range of reader/writer 11. Controller 8, reading the priority orders stored in communication priority storing memory 12 at the beginning of the communication, and determines the priority order for the communication (S201).

If the priority order stored in communication priority storing memory 12 is in the order of type A, B and C, processing goes to the flow shown in FIG. 14, as mentioned above.

Figure 20:
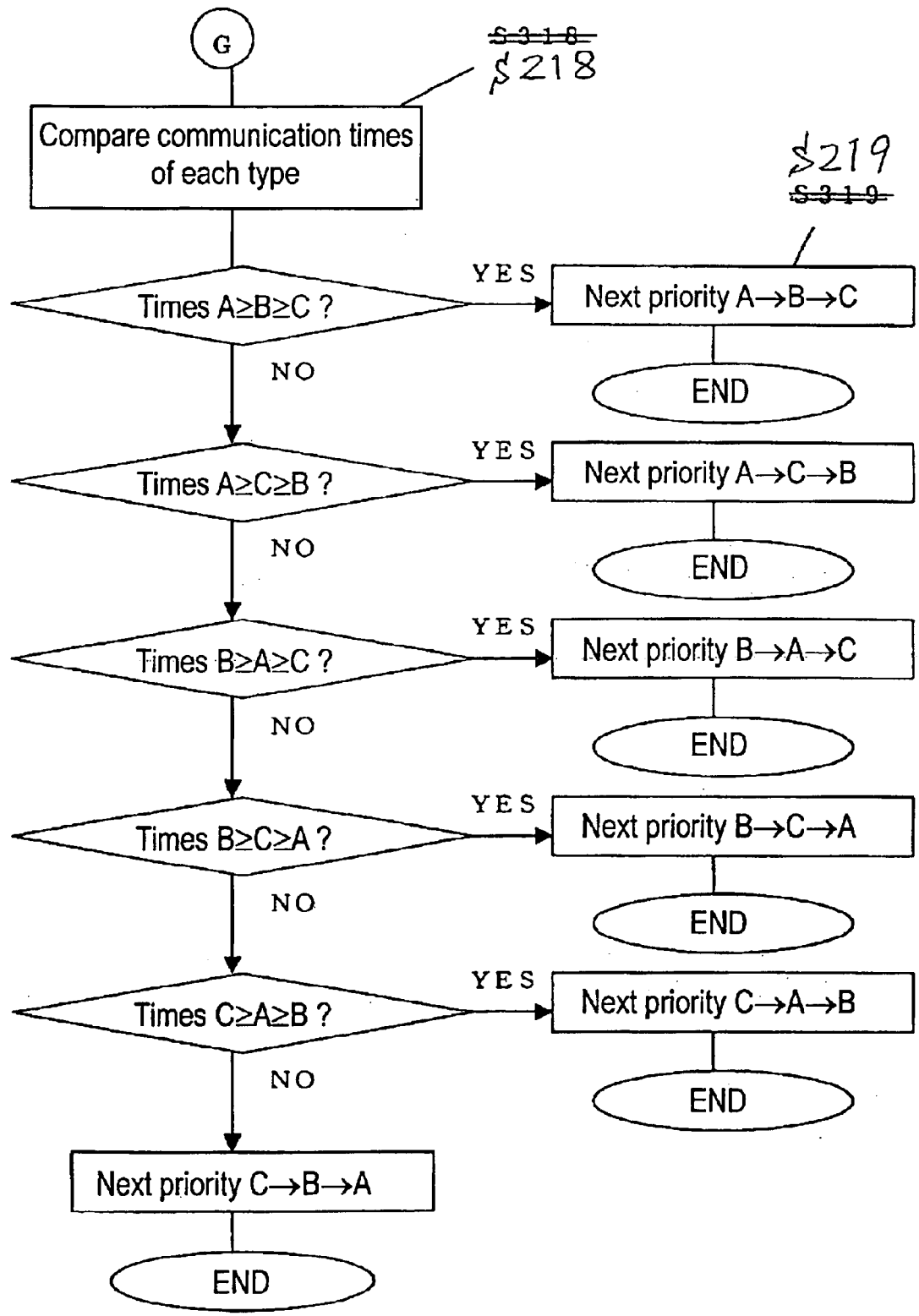
FIG. 20 is a flowchart of communication processing of a reader/writer in the second exemplary embodiment of the present invention.

The processing is explained with reference to FIG. 14 and FIG. 20 on the case that reader/writer 11 communicates with a type C noncontact-IC-information-carrier in the above condition.

Controller 8 reads a setting of communication enable/inhibit setting unit 4. The setting is for enabling communication with type A (S211). Accordingly, assuming the noncontact-IC-information-carrier as type A, controller 8 allows transmitter 2 to send a command for type A (S212). Controller 8, however, fails in communication, since the noncontact IC information carrier being in the communication range of reader/ writer is type C (S213).

Next, controller 8 reads the setting of communication enable/inhibit setting unit 4. Controller 8 does not make communication, since the setting for inhibiting communication with type B (S214).

Next, controller 8 reads the setting of enable/inhibit setting unit 4. The setting is for enabling communication with type C (S215). Accordingly, assuming the noncontact-IC-information-carrier as type C, controller 8 allows transmitter 2 to send a command for type C (S216). Receiver 3 can receive a response from the information carrier, since the noncontact IC information carrier communicating with reader/writer 11 is type C (S217).

Subsequently, required processing is performed. In the present exemplary embodiment, after finishing to read information from the information carrier, a number of communication times is increased by one for type C noncontact IC information carrier. The number is saved in communication times memory 13 with a newly recalculated check code 45 (S218).

Numbers of reading times with respect to each kind of noncontact IC information carriers are compared. Then, the priority order is determined in order of the number of reading times, for next communication. The priority order is stored in communication priority storing memory 12.

In the present exemplary embodiment, a number of communication times changes to ten (10) for type A, three (3) for type B and two (2) for type C respectively, after the communication with type C noncontact IC information carrier.

Therefore, a priority order arranging type A as the first, followed by B and C is stored in communication priority storing memory 12 (S219).

Generally, the same kind of noncontact IC information carriers tends to communicate with the reader/writer with respect to each place. Therefore, the reader/writer in the present exemplary embodiment makes the noncontact IC information carriers used usually with the first priorit The reader/writer communicates with other kind noncontact IC information carriers than usual kind in an exceptional case. The priority for usual kind of noncontact IC information carrier is kept as the first priority, if the reader/writer has communicated with the kind of noncontact IC information carrier several times previously. Therefore, the reader/writer can perform a speedy information processing for the usual kind of noncontact IC information carrier afterwards, even if an exceptional case occurred.

In addition, reader/writer 11 of this exemplary embodiment stores a priority order for next communication in communication priority storing memory 12. Therefore, the number of communication times with respect to each kind of noncontact IC information carriers stored in the communication times memory are not necessarily compared each other to determine the priority order, when next communication is made. A speedy communication processing can be thus performed.

Additionally, reader/writer 11 of this exemplary embodiment includes clearing unit 14 to clear data in communication times memory 13 from the outside. For example, when a reader/writer is moved to a different place and the reader/writer usually communicates with a different kind of noncontact IC information carrier than previously communicating with, a new number of communication times is stored in communication times memory 13. Therefore, communication processing can be performed speedily as before moved.

The data in communication times memory 13 is erased by reading in a predetermined noncontact IC information carrier designed for setting. Then the reader/writer newly counts a number of communication times, for example, when used or installed in different places. Therefore, the reader/writer can perform communication processing speedily at a place after moved, even if, as usual processing, the reader/writer communicates with a different kind of noncontact IC information carrier than before moved.

In the present exemplary embodiment, communication times memory 13 employs an EEPROM, a nonvolatile memory. The reader/writer can keep the priority order for next communication unchanged, even if power supply 9 stops.

After recovery of power supply, therefore, the reader/writer can perform a speedy communication with the same kind of noncontact information carrier as the previous communication time.

Moreover, communication times memory 13 stores check code 45, which performs sending a notice to the outside though noticing unit 15, in case of some abnormalities in communication times memory 13. The reader/writer 11 can be thus prevented from wrong operation due to erroneous information. Herein, some abnormalities means, for example, a case when reading times for type A shows 10000 times, though no communication is made with type A.

Though notice unit 15 in the present exemplary embodiment employs a red LED, LEDs having different colors or any units that alarms the outside such as buzzer are available for the purpose.

In addition, in the present exemplary embodiment, power supply 9 employs Lithium ion secondary battery. A shortened communication time reduces power consumption of battery used for power supply 9, thereby resulting a longer continuous operating time.

Moreover, in the present exemplary embodiment, communication enable/inhibit unit 4 employs a DIP switch. Communications from other units or a predetermined noncontact IC information carrier for settings may be used to set enabling or inhibiting communication.

Accordingly, reader/writer 11 can be prevented from communicating with unnecessary noncontact IC information carriers and thus can perform a speedy communication processing.

In the present exemplary embodiment, communication times memory 13 employs EEPROM. Other nonvolatile memories such as Ferroelectric Random Access Memory (FeRAM) can also be used for the purpose.

Third Exemplary Embodiment

The information communication system in this exemplary embodiment of the present invention is explained with reference to FIG. 21A and FIG. 21B.

Figure 21A:
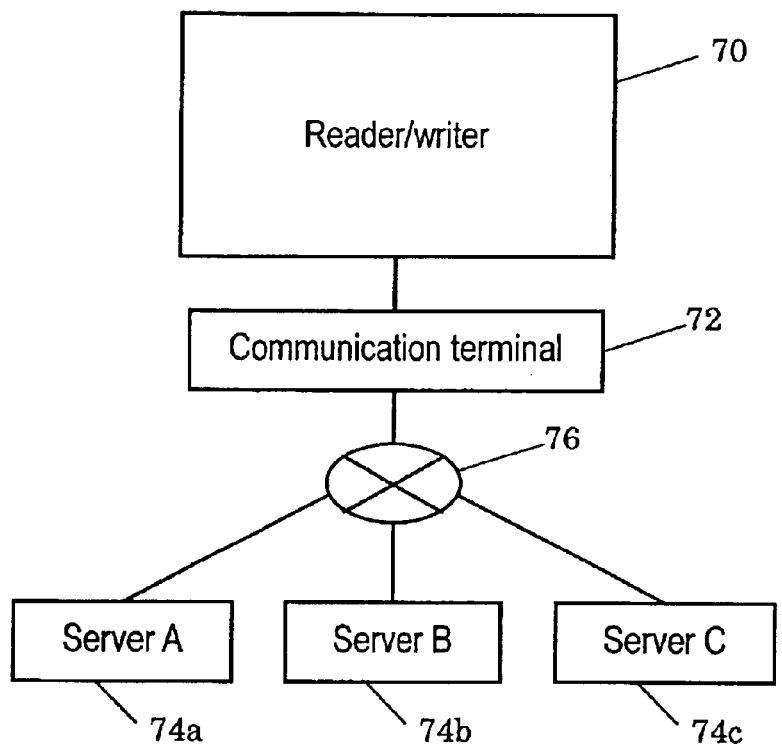
FIG. 21A ad FIG. 21B are block diagrams of information communication systems in the third exemplary embodiment of the present invention.

In FIG. 21A, reader/writer 70 communicates with servers 74a, 74b and 74c through communication terminal 72 and network 76. Herein, reader/writer 70 has, for example, the same function and structure as described in the first exemplary embodiment of the present invention.

In addition, network 76 includes at least one of wired networks and wire-less networks. Communication terminal 72 communicates with network 76. In the information communication system, reader/writer 70 reads information from a noncontact IC information carrier. Communication terminal 72 sends the information, according to contents of the information, to a proper server to receive the information among a plurality of servers 74. The information may be sent, according to the kind of noncontact IC information carrier, to the most appropriate server among a plurality of servers 74.

On the other hand, the server, responsive to the information received, may send back other information, for example, charge information incurred in the server to reader/writer 70 through network 76.

Reader/writer 70, then, may write the information received from servers 74 to noncontact IC information carrier.

Figure 21B:
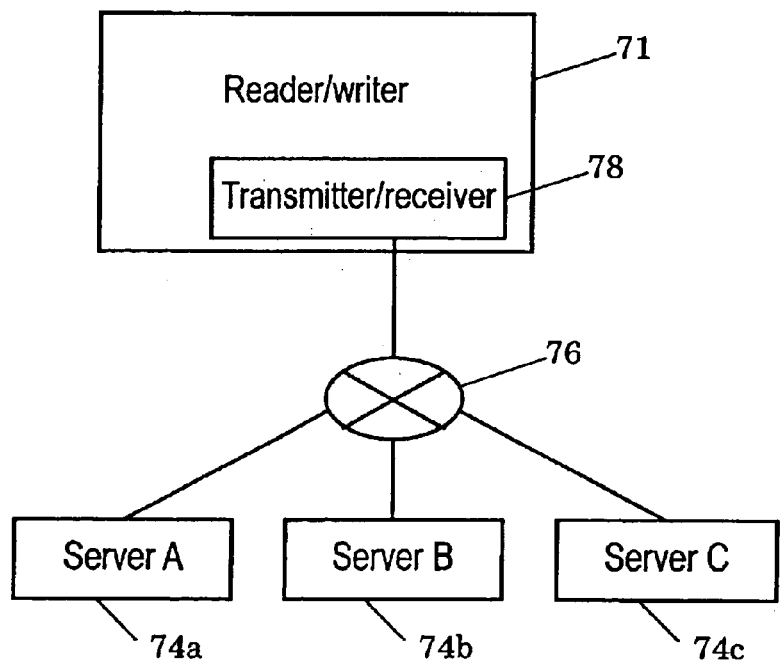

In addition, as shown in FIG. 21B, reader/writer 71 may include transmitter/receiver 78. In this case, transmitter/receiver 78 communicates with servers 74 instead of communication terminal 72.

As aforementioned exemplary embodiments, in this exemplary embodiment, the reader/writer can determine the priority order for next communication based on the priority order and the kind of noncontact information carrier with which the reader/writer communicated previously.

In addition, a reader/writer sends information, according to the information which the reader/writer reads, to the most appropriate server. Moreover, the reader/writer can write the information received from the servers to the noncontact information carrier.

Fourth Exemplary Embodiment

The management system in the fourth exemplary embodiment of the present invention is explained with reference to FIG. 22.

Figure 22:
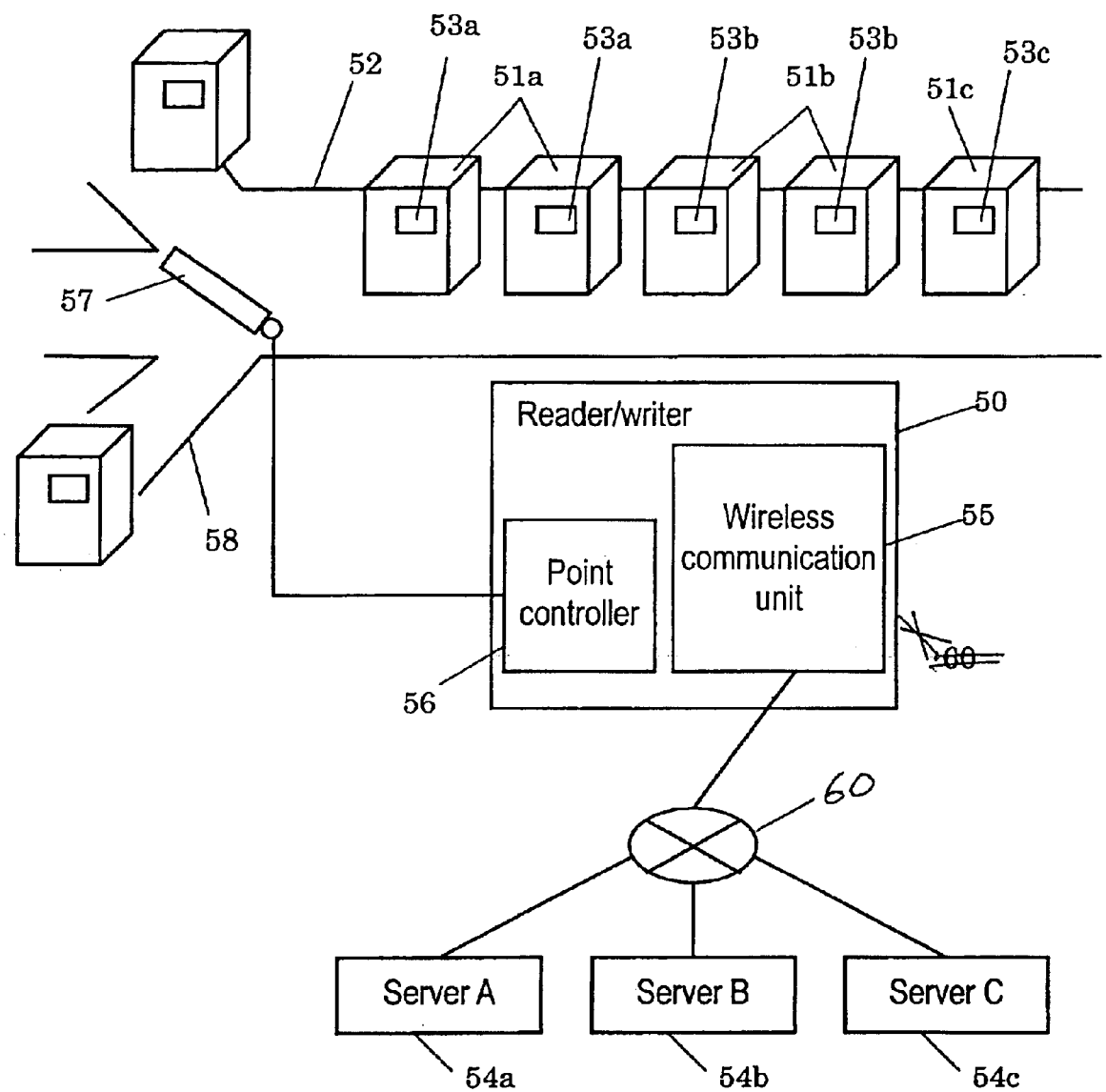
FIG. 22 is a schematic view of a management system in the fourth exemplary embodiment of the present invention.
Figure 23:
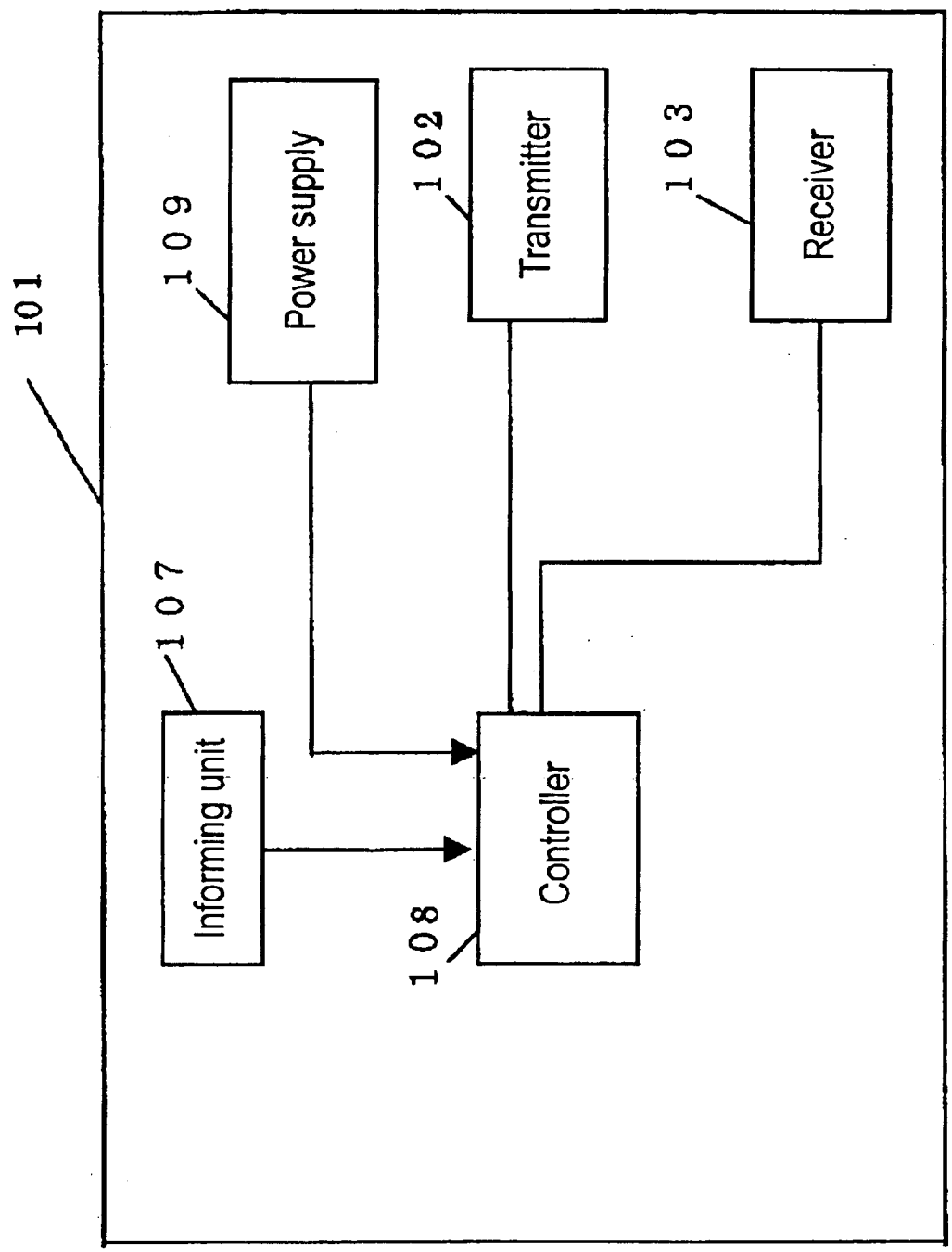
FIG. 23 is a block diagram for showing an example of the structure of conventional reader/writers.

FIG. 22 shows, for example, an unloading work in a warehouse of a general distribution center in which packages of a plurality of express package services are collected and delivered. Packages 51, collected from express agencies of each express package services, are once collected here, then sorted and delivered to each destination. First, parcels 51 unloaded from trucks are put on article conveying-way 52. Noncontact IC information carrier 53 of each express package service is attached to each package 51.

Suppose that packages 51 of three express package services, A, B and C are treated in this exemplary embodiment.

Type A noncontact-IC-information-carrier 53a is attached to package 51a of express package service A.

Type B noncontact-IC-information-carrier 53b is attached to package 51b of express package service B.

Type C noncontact-IC-information-carrier 53c is attached to package 51c of express package service C.

In addition, reader/writer 50 having the same structure as noncontact IC information carrier reader/writer (herein after called reader/writer) 1 described in the first exemplary embodiment is disposed in a halfway of article conveying-way 52. Moreover, reader/writer 50 includes wireless communication-unit 55 and point controller 56. Wireless communication-unit 55 communicates with network 60 by wireless communication. Network 60 communicates with servers 54A, 54B and 54C, each of which is for each express package service.

Point controller 56 controls point 57. Point 57 allows each of packages 51 to enter from article conveying-way 52 to one of divided ways 58, to sort each of packages 51 to each destination. Reader/writer 50 reads information and a kind of noncontact IC information carrier 53 carried on packages 51 transported on conveying-way 52. The information read is sent to wireless communication-unit 55. Wireless communication-unit 55 accesses server 54 of each express package service, according to a kind of the noncontact IC information carrier. Reader/writer 50 registers server 54 that the packages are stored in the warehouse. At the same time, Reader/writer 50 receives destination information of package 51, based on information of noncontact IC information carrier 53, from server 54. The destination information is sent to dividing point controller 57. Dividing point controller 56 sorts packages 51 by switching point 57, according to the destination.

Moreover, noncontact IC information carrier 53 can store not only destination information but also other information concerning packages 51, such as a kind of package, storage period in the warehouse until delivery to the next destination. Therefore, packages 51 are stored or placed in predetermined places according to information included into noncontact-IC-information-carrier 53.

In addition, the kinds and the quantity of packages to be stored are controlled according to information on package 51 stored in noncontact-IC-information-carrier 53.

Packages 51 transported on conveying-way 52 are collected by express agencies of each express package service in a sizable quantity. In many cases, therefore, packages 51 are transported on conveying-way 52 in a sizable quantity with respect to each express package service. For example, after twenty (20) packages of A company, fifteen (15) packages of B company are transported Reader/writer 50, in the same way as reader/writer 1 described in the first exemplary embodiment, determines a priority order for next communication, after the communication with the noncontact IC information carrier 53 is completed, and makes the next communication.

The priority order for next communication is determined based upon current priority order in the communication processing and upon the kind of noncontact IC information carrier which the reader/writer has communicated with.

Accordingly, reader/writer 50 can speedily read-in information from a noncontact-IC-information-carrier and thus can shorten tact time of the logistic system.

In addition, when the same kind of noncontact IC information carrier is assigned as the first priority order for both current and next communication time, the communication with server 54 may be kept connecting. A logistic system can be performed more efficiently in a shortened tact time.

Additionally, in the fourth exemplary embodiment, a reader/writer includes a wireless communication unit. The wireless communication unit may be integrated into the reader/ writer or interfaced with an external device using a cable or the like.

INDUSTRIAL APPLICABILITY

As mentioned above, the reader/writer disclosed in this invention carries out communication determining the priority order for next communication, from the priority order of current communication processing and the kind of noncontact information carrier with which the reader/writer has communicated.

Therefore, the reader/writer in the present invention can perform a speedy communication with a noncontact information carrier In addition, even if the reader/writer communicates with other kind noncontact IC information carriers exceptionally, the reader/writer can perform a speedy data processing with the noncontact information carrier usually used after exceptional cases.

Therefore, if the reader/writer is powered by a battery, a shortened communication time will reduce power consumption of battery used, thereby resulting a longer operating time.

In addition to the above benefits of the reader/writer, according to the information communication system in the present invention, the reader/writer can send information to the most appropriate server, based on information read from a noncontact information carrier.

In addition to the merits of the reader/writer above mentioned, a management system in the present invention can stock or place articles after sorting, based on a kind of noncontact information carrier read in reader/writer.

What is claimed is:

1. A noncontact reader/writer for plural kinds of noncontact information carriers comprising:
    a transmitter for sending a signal to each of the plural kinds of noncontact information carriers;
    a receiver for receiving a signal from said each of the plural kinds of noncontact information carriers;
    a memory for storing information on a kind of at least one of the plural kinds of the noncontact information carriers with which the noncontact reader/writer has communicated; and
    a controller for determining, based upon the information, a priority order in a communication processing on a kind of noncontact information carrier, among the plural kinds of noncontact information carriers, and for carrying out the communication processing, and
    a priority memory for storing a priority table for showing a priority order on the kind of the plural kinds of noncontact information carriers with which the noncontact reader/writer communicates,
    wherein said memory includes a pointer memory to store a pointer value showing a specific priority order in the priority table, as the information; and
    according to each kind of the plural kinds of noncontact information carriers with which the noncontact reader/writer has communicated, the controller determines the pointer value, and in next communication, the controller carries out communication processing, by determining the priority order in the communication processing based on the priority order shown by the pointer value.

2. The noncontact reader/writer of claim 1, wherein the priority memory is formed of a nonvolatile memory.

3. The noncontact reader/writer of claim 2, wherein the noncontact reader/writer is powered by a battery.

4. The noncontact reader/writer of claim 1, further comprising:
    a communication enable/inhibit setting unit capable for setting, to enable or to inhibit a communication with respect to each kind of the noncontact information carriers.

5. The noncontact reader/writer of claim 4, wherein the noncontact reader/writer is powered by a battery.

6. The noncontact reader/writer of claim 1, wherein
    the memory includes a communication times memory for storing a number of communication times with respect to each kind of the plural kinds of noncontact information carriers with which the noncontact reader/writer has communicated, as the information; and
    the controller, according to a content of the communication times memory, determines a communication priority order and carries out communication processing.

7. The noncontact reader/writer of claim 6, further comprising:
    a communication priority storing memory for storing a priority order for communicating with each kind of the plural kinds of noncontact information carriers.

8. The noncontact reader/writer of claim 7, wherein the priority memory is formed of a nonvolatile memory.

9. The noncontact reader/writer of claim 7, further comprising:
    a clearing unit for clearing data in the communication times memory.

10. The noncontact reader/writer of claim 7, further comprising:
    a communication enable/inhibit setting unit capable of setting whether to enable or to inhibit communication with each kind of the plural kinds of noncontact information carriers.

11. The noncontact reader/writer of claim 7, wherein the noncontact reader/writer is powered by a battery.

12. The noncontact reader/writer of claim 6, wherein the priority memory is formed of a nonvolatile memory.

13. The noncontact reader/writer of claim 12, wherein the nonvolatile memory stores an error check code.

14. The noncontact reader/writer of claim 13, further comprising:
    a noticing unit for noticing an abnormality in the nonvolatile memory found by the error check code to an outside of said noncontact reader/writer.

15. The noncontact reader/writer of claim 6, further comprising:
    a clearing unit for clearing data in the communication times memory.

16. The noncontact reader/writer of claim 6, further comprising:
    a communication enable/inhibit setting unit capable of setting whether to enable or to inhibit communication with each kind of the plural kinds of noncontact information carriers.

17. The noncontact reader/writer of claim 6, wherein the noncontact reader/writer is powered by a battery.

18. The noncontact reader/writer of claim 1, wherein the noncontact reader/writer is powered by a battery.

19. A information communication system comprising:
    a noncontact reader/writer for a plural kinds of noncontact information carriers comprising:
    a transmitter for sending a signal to each of the plural kinds of noncontact information carriers;
    a receiver for receiving a signal from said each of the plural kinds of noncontact information carriers;
    a memory for storing information on a kind of at least one of the plural kinds the noncontact information carriers with which the noncontact reader/writer has communicated; and
    a controller for determining, based upon the information, a priority order in a communication processing on a kind of noncontact information carrier, among the plural kinds of noncontact information carriers, and for carrying out the communication processing;

a communication terminal for sending information of the noncontact IC information carriers read by said noncontact reader/writer;

a group of servers for communicating with the communication terminal, wherein the information read by the noncontact reader/writer is, according to the information read, sent to a specific server among the group of severs;

wherein said noncontact reader/writer further comprising:

a priority memory for staring a priority table for showing a priority order in the kind of the plural kinds of noncontact information carriers with which the noncontact reader/writer communicates, wherein said memory includes a pointer memory to store a pointer value showing a specific priority order in the priority table, as the information; and according to each kind of the plural kinds of noncontact information carriers with which the noncontact reader/writer has communicated, the controller determines the pointer value, and in next communication, the controller carries out communication processing, by determining the priority order in the communication processing based in the priority order shown by the pointer value.

20. The information communication system of claim 19, wherein the memory includes a communication times memory for storing a number of communication times with respect to each kind of the plural kinds of noncontact information carriers with which the noncontact reader/writer has communicated, as the information; and the controller, according to a content of the communication times memory, determines a communication priority order and carries out communication processing.

21. The information communication system of claim 20, wherein the noncontact reader/writer includes the communication terminal.

22. The information communication system of claim 21, wherein the information read in the noncontact reader/writer is, according to a kind of the noncontact information carriers included in the information read, sent to a specific server among the group of servers.

23. The information communication system of claim 20, wherein the information read in the noncontact reader/writer is, according to a kind of the noncontact information carriers included in the information read, sent to a specific server among the group of servers.

24. The information communication system of claim 19, wherein the information read in the noncontact reader/writer is, according to a kind of the noncontact information carriers included in the information read, sent to a specific server among the group of servers.

25. The information communication system of claim 19, wherein the noncontact reader/writer includes the communication terminal.

26. The information communication system of claim 25, wherein the information read in the noncontact reader/writer is, according to a kind of the noncontact information carriers included in the information read, sent to a specific server among the group of servers.

27. The information communication system of claim 19, wherein the information read in the noncontact reader/writer is, according to a kind of the noncontact information carriers included in the information read, sent to a specific server among the group of servers.

28. The information communication system of claim 19, wherein the information read in the noncontact reader/writer is, according to a kind of the noncontact information carriers included in the information read, sent to a specific server among the group of servers.

29. A management system comprising:

a noncontact reader/writer for plural kinds of noncontact information carriers comprising:

a transmitter for sending a signal to each of the plural kinds of noncontact information carriers;

a receiver for receiving a signal from each of the plural kinds of noncontact information carriers;

a memory for storing information on a kind of at least one of the plural kinds of the noncontact information carriers with which the noncontact reader/writer has communicated;

a controller for determining, based upon the information, a priority order in a communication processing on a kind of noncontact information carrier, among the plural kinds of noncontact information carriers, and for carrying out the communication processing;

a conveying-way on which an article having at least one of the plural kinds of noncontact information carriers travel, wherein the article is sorted based on a kind of the plural kinds of noncontact information carriers;

wherein the noncontact reader/writer further comprising:

a priority memory for storing a priority table for showing a priority order on the kind of the plural kinds of noncontact information carriers with which the noncontact reader/writer communicates, wherein said memory includes a pointer memory to store a pointer value showing a specific priority order in the priority table, as the information; and according to each kind of the plural kinds of noncontact information carriers with which the noncontact reader/writer has communicated, the controller determines the pointer value, and in next communication, the controller carries out communication processing, by determining the priority order in the communication processing based on the priority order shown by the pointer value.

30. The management system or claim 29, wherein the memory includes a communication times memory for storing a number of communication times with respect to each kind of the plural kinds of noncontact information carriers with which the noncontact reader/writer has communicated as the information, and the controller, according to a content of the communication times memory, determines a communication priority order and carries out communication processing.

31. The management system of one of claim 30, wherein the management system stocks or places the article sorted.

32. The management system of claim 29, wherein the management system stocks or places the article sorted.

33. The management system of one of claim 29, wherein the management system stocks or places the article sorted.

34. A noncontact reader/writer for plural kinds of noncontact information carriers comprising:

a transmitter for sending a signal to each of the plural kinds of noncontact information carriers;

a receiver for receiving a signal from said each of the plural kinds of noncontact information carriers;

a memory for storing a priority table for showing a priority order on the kind of the plural kinds of noncontact information carriers with which the noncontact reader/writer communicates, and for storing a pointer value showing a specific priority order in the priority table; and a controller for determining the pointer value according to each kind of the plural kinds of noncontact information carriers with which the noncontact reader/writer has communicated, and in next communication, the controller carrying out communication processing, by determining the priority order in the communication processing based on the priority order shown by the pointer value.

35. The noncontact reader/writer of claim 34, further comprising:

a communication enable/inhibit setting unit capable for setting, to enable or to inhibit a communication with respect to each kind of the noncontact information carriers.

36. The noncontact reader/writer of claim 34, wherein the noncontact reader/writer is powered by a battery.

* * * * *

UNITED STATES PATENT AND TRADEMARK OFFICE
CERTIFICATE OF CORRECTION

PATENT NO. : 6,899,270 B2
DATED : May 31, 2005
INVENTOR(S) : Keiichiro Obayashi et al.

It is certified that error appears in the above-identified patent and that said Letters Patent is hereby corrected as shown below:

Title page,
Item [57], ABSTRACT,
Line 11, "carries" should read -- carriers --.

Column 15,
Line 12, "staring" should read -- storing --.
Lines 13 and 25, "in" should read -- on --.

Column 16,
Line 46, "or" should read -- of --.
Line 58, between "of" and "claim", insert -- one of --.

Signed and Sealed this

Twentieth Day of December, 2005

JON W. DUDAS
*Director of the United States Patent and Trademark Office*